(12) United States Patent
Hwang et al.

(10) Patent No.: US 11,156,752 B2
(45) Date of Patent: Oct. 26, 2021

(54) OPTICAL FILTER INCLUDING METAL NANOSTRUCTURES, OPTICAL DEVICE INCLUDING METAL NANOSTRUCTURES, AND METHOD FOR PRODUCING OPTICAL FILTER INCLUDING METAL NANOSTRUCTURES

(71) Applicant: Samsung Electronics Co., Ltd., Suwon-si (KR)

(72) Inventors: Gyu Weon Hwang, Seoul (KR); Kyeong Seok Lee, Seoul (KR); Won Mok Kim, Seoul (KR)

(73) Assignee: SAMSUNG ELECTRONICS CO., LTD., Gyeonggi-do (KR)

( * ) Notice: Subject to any disclaimer, the term of this patent is extended or adjusted under 35 U.S.C. 154(b) by 232 days.

(21) Appl. No.: 16/069,612

(22) PCT Filed: Jul. 31, 2017

(86) PCT No.: PCT/KR2017/008259
§ 371 (c)(1),
(2) Date: Jul. 12, 2018

(87) PCT Pub. No.: WO2018/026156
PCT Pub. Date: Feb. 8, 2018

(65) Prior Publication Data
US 2019/0004222 A1     Jan. 3, 2019

(30) Foreign Application Priority Data

Aug. 2, 2016  (KR) .................... 10-2016-0098456
Apr. 26, 2017  (KR) .................... 10-2017-0053893

(51) Int. Cl.
*G02B 5/20* (2006.01)
*G01J 1/04* (2006.01)
*G01J 1/44* (2006.01)

(52) U.S. Cl.
CPC .......... *G02B 5/206* (2013.01); *G01J 1/0488* (2013.01); *G02B 5/201* (2013.01); *G01J 1/44* (2013.01); *G02B 2207/101* (2013.01)

(58) Field of Classification Search
CPC .. G02B 5/206; G02B 5/201; G02B 2207/101; G01J 1/0488; G01J 1/44;
(Continued)

(56) References Cited

U.S. PATENT DOCUMENTS 8,094,394 B2   1/2012   Yamada et al.
8,203,635 B2   6/2012   Lee
(Continued)

FOREIGN PATENT DOCUMENTS

CN   101730857 A   6/2010
CN   103733340 A   4/2014
(Continued)

OTHER PUBLICATIONS

International Search Report PCT/ISA/210 for International Application No. PCT/KR2017/008259 dated Dec. 6, 2017.
(Continued)

*Primary Examiner* — Jennifer D Bennett
(74) *Attorney, Agent, or Firm* — Harness, Dickey & Pierce, P.L.C.

(57) ABSTRACT

Provided is an optical filter including a first filter region including a first layer of a first refractive index and a plurality of first metal nanostructures in the first layer, and a second filter region including a second layer of a second refractive index and a plurality of second metal nanostructures in the second layer, wherein the first refractive index is different from the second refractive index.

13 Claims, 24 Drawing Sheets

(58) Field of Classification Search
CPC .......... G01J 2003/2806; G01J 3/12; G01J 2003/1234; G01J 2003/123; H01L 27/14621
See application file for complete search history.

(56) References Cited

U.S. PATENT DOCUMENTS

| | | | |
|---|---|---|---|
| 8,816,358 B1* | 8/2014 | Tsai | H01L 27/307 257/79 |
| 9,484,377 B2 | 11/2016 | Won et al. | |
| 10,103,189 B2 | 10/2018 | Yokogawa | |
| 2008/0238314 A1* | 10/2008 | Jeoung | H01J 11/12 313/582 |
| 2009/0296246 A1* | 12/2009 | Yamada | B82Y 20/00 359/885 |
| 2012/0061553 A1* | 3/2012 | Yokogawa | H01L 27/14621 250/208.1 |
| 2012/0085944 A1* | 4/2012 | Gidon | H01L 27/14621 250/553 |
| 2014/0061486 A1 | 3/2014 | Bao et al. | |
| 2014/0146207 A1* | 5/2014 | Yokogawa | H01L 27/14621 348/281 |
| 2015/0214261 A1 | 7/2015 | Park et al. | |
| 2015/0350540 A1 | 12/2015 | Borthakur et al. | |

FOREIGN PATENT DOCUMENTS

| | | |
|---|---|---|
| CN | 204633909 U | 9/2015 |
| JP | 2008191144 A | 8/2008 |
| JP | 2010177130 A | 8/2010 |
| KR | 100853196 B1 | 8/2008 |
| KR | 20130140302 A | 12/2013 |
| KR | 20140053948 A | 5/2014 |
| KR | 20140072407 A | 6/2014 |
| KR | 20150067141 A | 6/2015 |

OTHER PUBLICATIONS

Written Opinion of the International Searching Authority PCT/ISA/237 for International Application No. PCT/KR2017/008259 dated Dec. 6, 2017.

* cited by examiner

FIG. 36

| R | G | B | G | R | G |
|---|---|---|---|---|---|
| B | H | B | H | B | H |
| R | G | R | G | R | G |
| B | H | B | H | B | H |

OPTICAL FILTER INCLUDING METAL NANOSTRUCTURES, OPTICAL DEVICE INCLUDING METAL NANOSTRUCTURES, AND METHOD FOR PRODUCING OPTICAL FILTER INCLUDING METAL NANOSTRUCTURES

CROSS-REFERENCE TO RELATED APPLICATIONS

This application is a national phase under 35 U.S.C. § 371 of PCT International Application No. PCT/KR2017/008259 which has an International filing date of Jul. 31, 2017, which claims priority to Korean Application Nos. 10-2016-0098456, filed Aug. 2, 2016 and 10-2017-0053893 filed Apr. 26, 2017, the entire contents of each of which are hereby incorporated by reference.

TECHNICAL FIELD

The present invention disclosed herein relates to an optical filter, and more particularly, to an optical filter configuring a unit filter by using a plurality of metal nanostructures, an optical device, and a method of manufacturing the optical filter.

BACKGROUND ART

An optical filter is a component for filtering a light of various wavelengths to an arbitrary wavelength band. As the optical filter, a linear variable filter (LVF) is well-known.

The LVF is a kind of optical filter having a Fabry-Perot resonator structure, and has a structure of which the thickness of a cavity is linearly variable in the length direction. In the LVF, a lower mirror layer and an upper mirror layer are disposed with the dielectric cavity interposed therebetween.

Such an LVF has a limitation in process reproducibility because of a linear structure in which the thickness varies in the length direction. Also, the resolution of spectrometer using a typical LVF is determined by a height-to-length ratio of the LVF and thus there is difficulty in minimizing a spectrometer element. In particular, due to the linear structure, it is disadvantageous in productivity, resulting from poor process compatibility with a two-dimensional imaging sensor technology.

Since a per-position transmission spectrum of an LVF is formed from an overlap of consecutive spectrums, and integration between the LVF and a photodetector is not monolithic, the LVF is spaced apart from a photodetector array, and due to a stray light effect according thereto, a filter performance is lowered.

There is an attempt to address such difficulty. For example, US patent application publication no. 2014/0061486 discloses a spectroscope using a quantum dot, and US patent application publication no. 2015/0350540 discloses an image sensor in which a color filter is implemented using a nanoparticle.

However, since there are various limitations in that a process is complex and various kinds of nanostructures are required to implement and use a filter as a spectroscope, a new optical filter is still required to be manufactured.

DISCLOSURE OF THE INVENTION

Technical Problem

The present invention provides a method of manufacturing an optical filter having various wavelength bands, wherein materials having different refractive indexes are used to change a resonance wavelength of a metal nanostructure and implement an additional filter using the metal nanostructure. Therefore, it is possible to reduce a necessary kind of metal nanostructure and simply and cheaply manufacture the optical filter having various wavelength bands.

The present invention also provides a manufacturing an optical filter having high resolving power. To this end, a central wavelength of a transmission or cut-off spectrum by plasmonic resonance of a metal nanostructure should be finely adjusted, but it is not easy to finely adjust the central wavelength only by adjusting a metal kind, shape, or size, etc., of the metal nanostructure. On the other hand, with a refractive index change of a medium, finer adjustment is possible and various filters having high resolving power may be designed.

Technical Solution

An embodiment of the present invention provides an optical filter including: a first filter region including a first layer of a first refractive index and a plurality of first metal nanostructures in the first layer; and a second filter region including a second layer of a second refractive index and a plurality of second metal nanostructures in the second layer, wherein the central wavelengths of the light transmit or cut-off spectrum by the first filter region and the second filter region are different. To achieve the above object, i) the optical filter includes the first and second refractive indexes different from each other, and the first and second metal nanostructures configured from the same kind of material. ii) The optical filter includes the first and second refractive indexes the same and the first and second metal nanostructures configured from the same kind of material. iii) The optical filter includes the first and second refractive indexes different from each other, and the first and second metal nanostructures configured from different kind of materials.

In an embodiment, configuration materials added to an identical material may be different or a concentration of a configuration material added to the identical material may be changed so as to make the first and second refractive indexes different.

In an embodiment, the first filter region and/or the second filter region may have a plurality of metal nanostructures embedded in a dielectric material.

In an embodiment, the first metal nanostructure and the second metal nanostructure may be an identical material or have an identical shape.

In an embodiment, the first metal nanostructure and the second metal nanostructure may be different materials or have different shapes.

An embodiment of the present invention provides an optical filter, including: two-dimensional filter regions on a plane in a checkerboard type such that when one direction is defined as horizontal axis, and a direction substantially vertical to horizontal axis is defined as vertical axis, different nanostructures are disposed in the horizontal axis, and media having different refractive indexes are spread in the vertical axis.

An embodiment of the present invention provides an optical device, including: photodetectors respectively corresponding to the first filter region and the second filter region. The optical device may be any one of a spectroscope, a CMOS image sensor, and a hyper spectral image sensor.

An embodiment of the present invention provides an optical filter module, including: a transmissive substrate and the above optical filter.

An embodiment of the present invention provides a method of manufacturing a planar optical filter, including: a step of providing a structure; a step of forming, on an upper part of the structure, a first filter region including a first layer of a first refractive index and a plurality of first metal nanostructures in the first layer; and a step of forming, on an upper part of the structure, a second filter region including a second layer of a second refractive index and a plurality of second metal nanostructures in the second layer, wherein the first refractive index is different from the second refractive index.

In an embodiment, in the step of forming the first filter region, the plurality of first metal nanostructures may be mixed in a solution of the first refractive index to be selectively spread, and in the step of forming the second filter region, the plurality of second metal nanostructures may be mixed in a solution of the second refractive index to be selectively spread.

In an embodiment, in the step of forming the first filter region, the plurality of first metal nanostructures may be mixed in a solution of the first refractive index to be selectively spread and form a layer, and the layer may be remained in the first filter region by using a photolithography process, and in the step of forming the second filter region, the plurality of second metal nanostructures may be mixed in a solution of the second refractive index to be selectively spread and form a layer, and the layer may be remained in the second filter region by using a photolithography process.

An embodiment of the present invention provides an optical device, including: a color filter layer configured to filter an incident light to at least R, G, B; a spectrum filter array configured to measure a spectrum of an object; and a plurality of photo detection regions configured to detect optical signals transmitted the color filter layer and the spectrum filter array.

In an embodiment, the spectrum filter array may be composed of a diffraction grating scheme filter, a prism scheme filter, a Fabry-Perot resonance filter, a plasmonic filter including a metal nanostructure array or a metal nanohole array, silicon nanowire-based filter, an absorptive filter, a resonant waveguide resonance mode filter, or an optical interference spectral filter using integrated-optics.

In an embodiment, the spectrum filter array may be an optical filter of one embodiment of the present invention.

In an embodiment, each of photo detection pixels of the photo detection regions may have an identical area to which an optical signal is incident.

In an embodiment, the optical device may further include a micro-lens on an upper part of the color filter and the spectrum filter array.

In an embodiment, unit spectrum filters of the spectrum filter array may be disposed in a constant period in the color filter layer.

In an embodiment, the photo detection regions may be configured from photo detection pixels of a CMOS image sensor.

In an embodiment, a size of a photo detection pixel of the photo detection regions corresponding to the color filter may be different from that corresponding to the spectrum filter.

Advantageous Effects

According to the above-described invention, when manufacturing a spectroscope by adopting a manufactured optical filter, an optical component such as a grating that is an essential element in a typical spectroscope is not used, and therefore, miniaturization is possible by simplifying an optical path, the weight may be reduced in comparison with a case where the grating is used, and a product less sensitive to the external environment may be manufactured.

In addition, an optical filter having various wavelength bands may be simply and cheaply manufactured using less kinds of metal nanostructures by easily changing the kind of the metal nanostructure and a refractive index of a medium. Typically, n optical filters may be manufactured with n kinds of metal nanostructures, but according to the present scheme, n×m optical filters may be manufactured from n kinds of metal nanostructures and m kinds of media having different refractive indexes.

BRIEF DESCRIPTION OF THE DRAWINGS

FIG. 36 is a conceptual diagram of a hyper spectral image sensor according to an embodiment of the present invention.

MODE FOR CARRYING OUT THE INVENTION

Hereinafter, the present invention will be described in detail with the accompanying drawings. However, the present invention is not limited to the exemplary embodiments disclosed below, but may be implemented in various forms. The following exemplary embodiments are described in order to enable those of ordinary skill in the art to embody and practice the invention.

Figure 1:
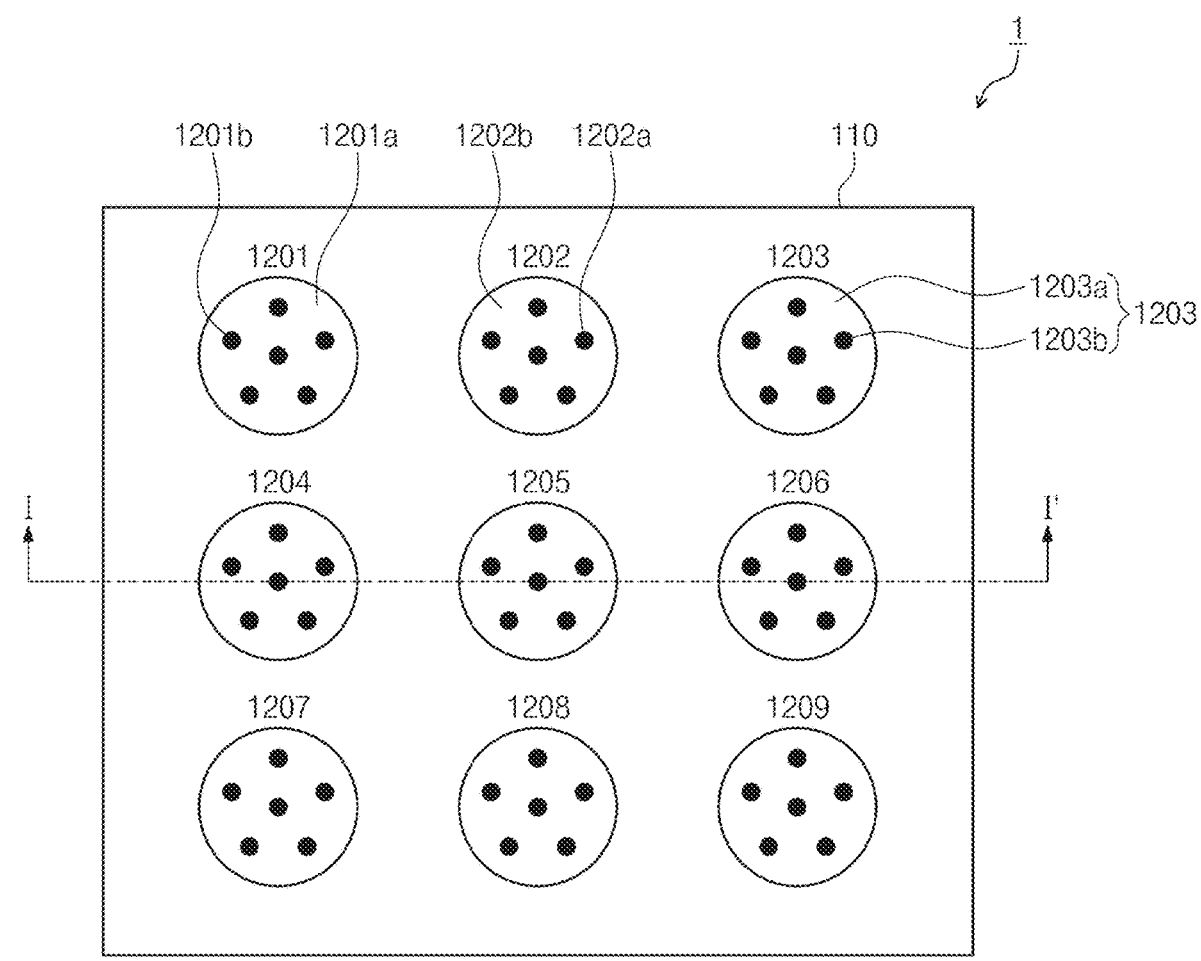
FIGS. 1 and 2 are respectively a plan view and a cross-sectional view of an optical filter according to an embodiment of the present invention.
Figure 2:
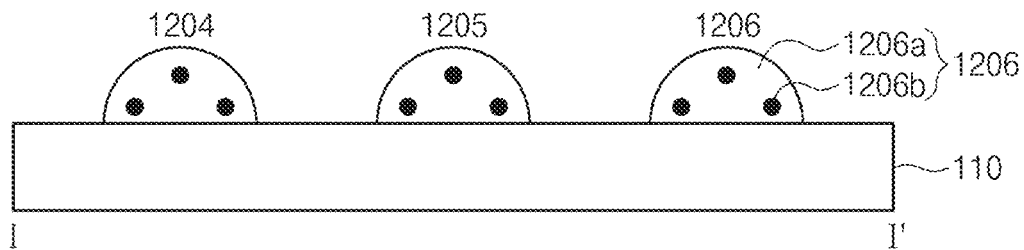

FIGS. 1 and 2 are respectively a plan view and a cross-sectional view of an optical filter according to an embodiment of the present invention.

An optical filter 1 is configured from a plurality of filter regions. In FIG. 1, 9 optical filters are exemplarily illustrated but the number is not particularly limited and variable. In this case, at least two filter regions are configured to cut off, i.e. reflect, absorb, scatter, or pass a light of various different wavelengths. Hereinafter, as an example of two different filter regions, a first filter region 1201 and a second filter region 1202 are mainly described.

The optical filter 1 includes the first filter region 1201 and the second filter region 1202. The first filter 1201 includes a first layer 1201a of a first refractive index and a plurality of first metal nanostructures 1201b inside the first layer 1201a. The second filter region 1202 includes a second layer 1202a of a second refractive index and a plurality of second metal nanostructures 1202b inside the second layer 1202a. In addition, each of the first and second filter regions 1201 and 1202 may be possibly implemented in a type that a plurality of metal nanostructures are embedded inside a dielectric material.

Here, i) the first and second refractive indexes may be different from each other, and the first and second metal nanostructures may be configured from the same kind of material, ii) the first and second refractive indexes may be the same and the first and second metal nanostructures may be configured from the same kind of material, and iii) the first and second refractive indexes may be different from each other and the first and second metal nanostructures may also be configured from different kind of materials.

Each of the filter regions 1201, 1202 to 1209 is possibly manufactured on an upper part of a structure 110. The commonly called "structure" means a lower support on which the optical filter of the present invention may be manufactured, and as the most typical example, a permeable substrate, or a permeable film, etc., may be possible. However, it is not limited to a certain kind such as a structure configured from at least a part of an optical device including a CMOS image sensor, etc., a semiconductor material and a dielectric material, or a metal, etc. On the other hand, the structure may possibly have a flat plane in a typical substrate type, and also possibly have an optical filter region only patterned in a well type. In this case, when a filter region is formed using a solution, it is advantageous in that an accurate position may be selected and an accurate size may be implemented.

The metal nanostructure is a metal nanoparticle (or structure) including nanospheres, nanorods, nanoplates, nanoplatelets, nanoparticles, nanotripods, or nanotetrapods, but not particularly limited thereto.

When the first and second layers are configured to have different refractive indexes, materials thereof may basically have different refractive indexes, or configuration materials to be added to the same material may be different so as to make refractive indexes different. Furthermore, a configuration material is added to the same material, but a refractive index thereof is made different by varying a concentration thereof. The first and second layers may preferably have different polymer materials. For example, there are a macromolecule material including poly (dimethyl siloxane), polycarbonate, poly (vinyl phenyl sulfide), poly (methyl metharcylate), poly (vinyl alcohol), poly (vinyl butyral), or poly (methyl acrylate), or a macromolecule including a copolymer, but not is limited thereto. In addition, various dielectric materials are also possible which include $SiO_x$, $Al_2O_3$, ZnO, or ZnSe, but not limited thereto.

A theoretical background of the present invention will be described.

An intrinsic absorption wavelength of the metal nanostructure by a localized surface plasmon (LSP) is determined by a metal dielectric constant, a medium dielectric constant, or a metal nanostructure shape. A dielectric constant ε of a material has a relationship of a refractive index n and an absorption coefficient κ as the following equation (1).

$$\bar{\varepsilon} = (n + ik)^2 \qquad (1)$$

where i denotes a unit of an imaginary number. The dielectric constant (or refractive index) of a material is a function varying according to a light wavelength λ.

An analytical solution related to light scattering by a typical shaped nanostructure does not exist, but a relationship of light scattering by a spherical or elliptical nanostructure having an arbitrary refractive index is disclosed by Gustav Mie. According to a quasistatic approximation of a Mie theory, for a spherical shape, a polarizability a in a dipole resonance mode is represented as the following equation (2), $$\alpha = \frac{(4\pi\varepsilon_0\varepsilon_d)R^3(\varepsilon_m - \varepsilon_d)}{2\varepsilon_d + \varepsilon_m}$$

and the polarizability has a resonance wavelength (=peak wavelength) at a wavelength λ satisfying $\varepsilon_m \approx -2\varepsilon_d$. A high-order multipole l at a wavelength λ satisfying the following equation, $$\varepsilon_m \approx -\left(\frac{l+1}{l}\right)\varepsilon_d$$

has the maximum value.

For a non-spherical shape, when l=1, a resonance wavelength is determined for a shape factor $A_i$ satisfying the following Equation, $$\varepsilon_m \approx \varepsilon_d\left(1 - \frac{1}{A_i}\right)$$

$A_i$ may be variously defined depending on a shape. For a spheroid shape, as an example, for a nanostructure of a rugby ball of which diameters of x, y, and z axes are respectively 2a, 2b, and 2c, shape factors $A_x$, $A_y$, and $A_z$ are obtained as the following equations.

$$A_x = \frac{abc}{2}\int_0^\infty \frac{ds}{(s+a^2)^{3/2}(s+b^2)^{1/2}(s+c^2)^{1/2}}$$

$$A_y = \frac{abc}{2}\int_0^\infty \frac{ds}{(s+a^2)^{1/2}(s+b^2)^{3/2}(s+c^2)^{1/2}}$$

$$A_c = \frac{abc}{2} \int_0^\infty \frac{ds}{(s+a^2)^{1/2}(s+b^2)^{1/2}(s+c^2)^{3/2}}$$

For a fully spherical shape, since each of the shape factors is ⅓, the same condition, i.e., $\varepsilon_m \approx -2\varepsilon_d$ is adopted as that of a spherical shape.

Figure 3:
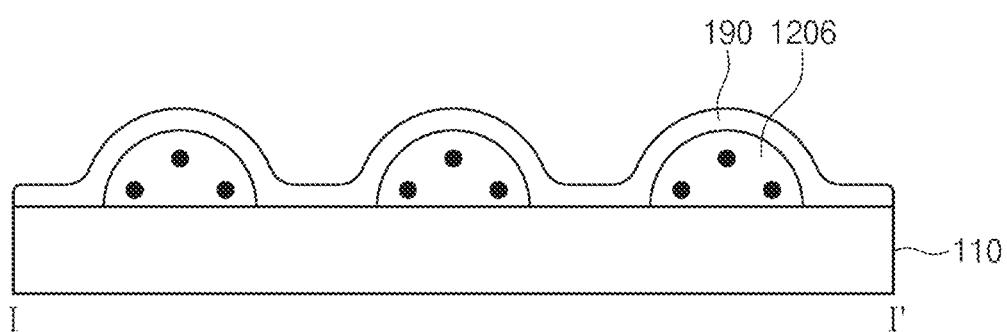
FIG. 3 is a cross-sectional view of an optical filter according to another embodiment of the present invention.

FIG. 3 is a cross-sectional view of an optical filter according to another embodiment of the present invention. For convenience of explanation, a difference with FIG. 2 will be mainly described. FIG. 3 shows a structure in which a protection film 190 configured to protect each filter region 1201, 1202, . . . 1209 is added.

As the protection film 190, a material is favored which has excellent and stable light transmission and is simply processed. As a representative material, a polymer material of PMMA, PVA, PDMS, or PC, etc., and an oxide material of $Al_2O_3$, $SiO_x$, ZnO, or spin-on-glass (SOG), etc., may be used.

Figure 4:
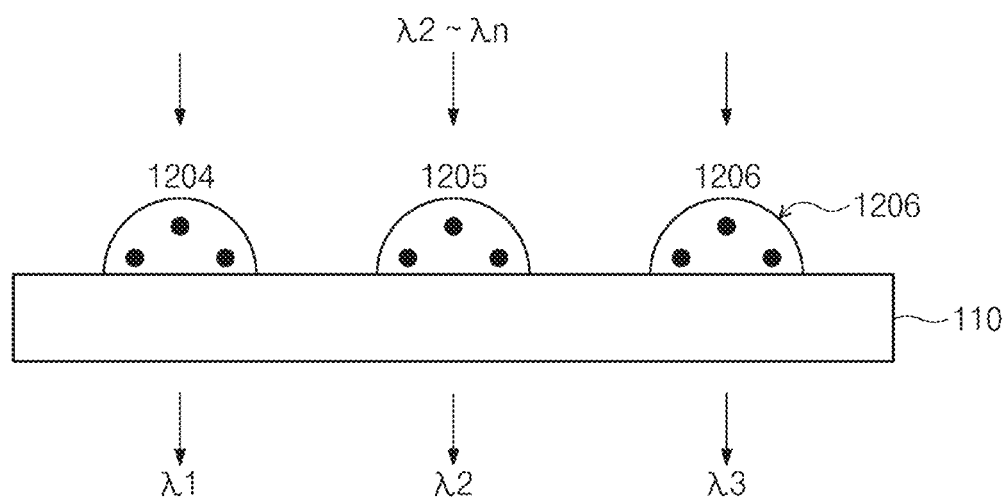
FIG. 4 is a conceptual diagram for explaining an operation of an optical filter according to an embodiment of the present invention.

FIG. 4 is a conceptual diagram for explaining an operation of an optical filter according to an embodiment of the present invention.

Referring to FIG. 4, when a light having a wavelength band of $\lambda_1$ to $X_n$ is incident to the present optical filter, filter regions 1204, 1205, and 1206 respectively pass lights of different wavelength bands. In this case, the filter region passes the light of $\lambda_1$ among the lights of the wavelength band of $\lambda_1$ to $\lambda_n$, the filter region 1205 passes the light of $\lambda_2$ among the lights having the wavelength band of $\lambda_1$ to $\lambda_n$, and the filter region 1206 passes the light of $\lambda_3$ among the lights having the wavelength band of $\lambda_1$ to $\lambda_n$. FIG. 3 illustrates a transmissive filter but a hand-stop filter may be also adopted.

Figure 5:
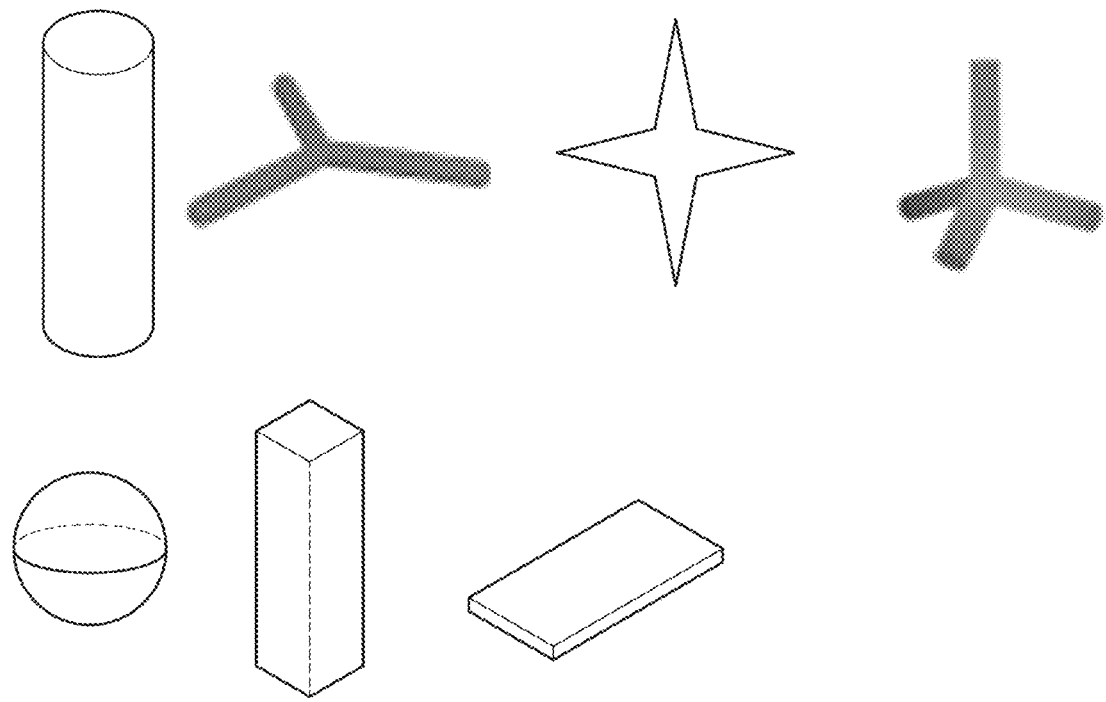
FIG. 5 is a drawing illustrating examples of metal nanostructures according to an embodiment of the present invention.

FIG. 5 is a drawing illustrating examples of metal nanostructures according to an embodiment of the present invention. Referring to FIG. 5, as the nanostructures, nanospheres, nanorods, nanoplates, nanoplatelets, nanodisk, nanoparticles, nanotripods, or nanotetrapods, etc., may be adoptable. On the other hand, a metal nanostructure of each filter region and the second metal nanostructure may have the same shape or different shapes from each other.

Figure 6:
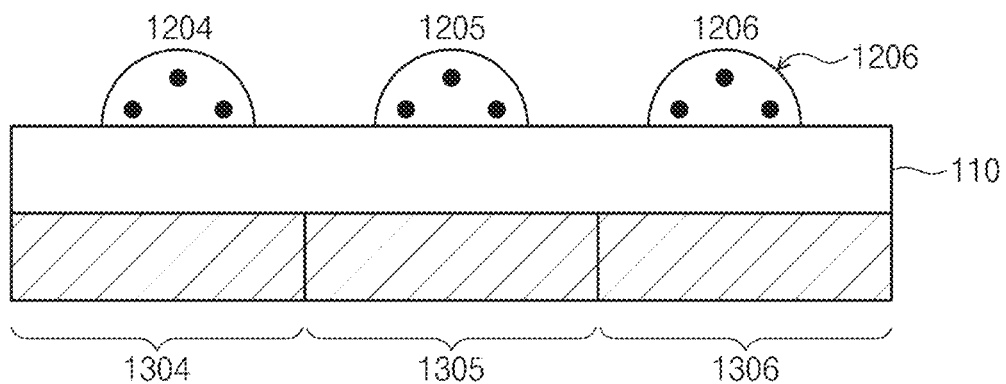
FIGS. 6 and 7 illustrate optical devices according to embodiments of the present invention.
Figure 7:
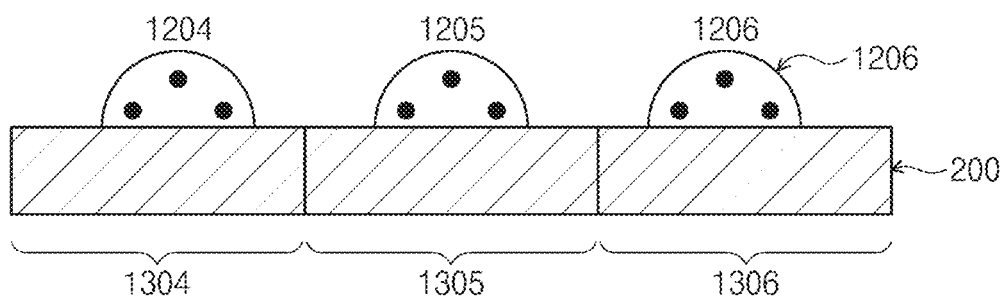

FIGS. 6 and 7 illustrate optical devices according to embodiments of the present invention.

The optical devices are provided with filter regions 1202, 1205, and 1206 and photodetectors 1304, 1305, and 1306 respectively corresponding thereto. FIG. 6 shows a type in which a structure 110 such as a transmissive substrate is inserted between the filter regions 1204, 1205, and 1206 and the photodetectors 1304, 1305, and 1306, and FIG. 7 shows a case where the structure 110 such as a transmissive substrate is not formed. The photodetectors perform a function of detecting a light corresponding to a wavelength band from each filter region, and performs a typically known function such as converting a quantity of light detected through an electric circuit unit and an electrode, etc., into an electric signal.

On the other hand, the optical filter of the present invention may be manufactured with a separate optical filter module that is formed on an upper part of a transmissive substrate (refer to FIGS. 2 and 3). The transmissive substrate may be a flexible substrate such as a glass or a polymer. For example, a transmissive film may be configured from a transparent or a semi-transparent polymer having an appropriate adhesive power or impact absorption. A specific example may be non-restrictively Polystyrene (PS), Expandable Polystyrene (EPS), Polyvinyl Chloride (PVC), Styrene Acrylonitrile Copolymer (SAN), Polyurethane (PU), Polyamide (PA), Polycarbonate (PC), Modified Polycarbonate, Polyvinyl butyral, Polyvinyl acetate, Acrylic Resin, Epoxy Resin (ER), Silicone Resin, Unsaturated Polyester (UP), polyimide, polyethylene naphtalate, or polyethylene terephtalate, etc., and these may be used individually or by mixing two or more. An optical filter module is manufactured in a type that a photodetector is not integrated thereto, and may be possibly used to be attached to the photodetector in actual use or in manufacturing a finished product. In the case of attaching the optical filter module to the photodetector in actual use, for example, it is possible to use by coupling the present optical filter module to the front of a camera lens.

Next, a description will be provided about a method of manufacturing an optical filter according to an embodiment of the present invention. FIGS. 8 to 11 are process charts of an example of manufacturing an optical filter according to an embodiment of the present invention.

Figure 8:
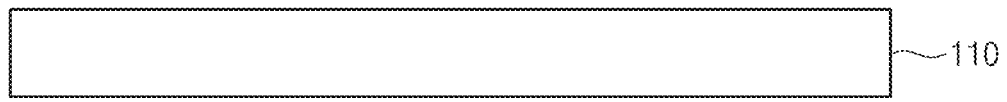
FIGS. 8 to 11 are process charts of an example of manufacturing an optical filter according to an embodiment of the present invention.

Referring to FIG. 8, a structure 110 such as a transmissive substrate is provided. Then, each filter region is formed with n×m mixture solutions by mixing, for example, polymer materials 1, 2, 3, . . . , n having different refractive indexes with different metal nanostructures 1, 2, . . . , m. If necessary, appropriate solvents are mixed therewith. A specific kind of solvent may be alcohol including methanol, ethanol, isopropyl alcohol, and butanol, etc., a hydrocarbon solvent including hexane, heptane, and octane, etc., aromatic solvent including benzene and toluene, ester, acetone, DMSO, THF, TCE, or chloroform, etc.

Figure 9:
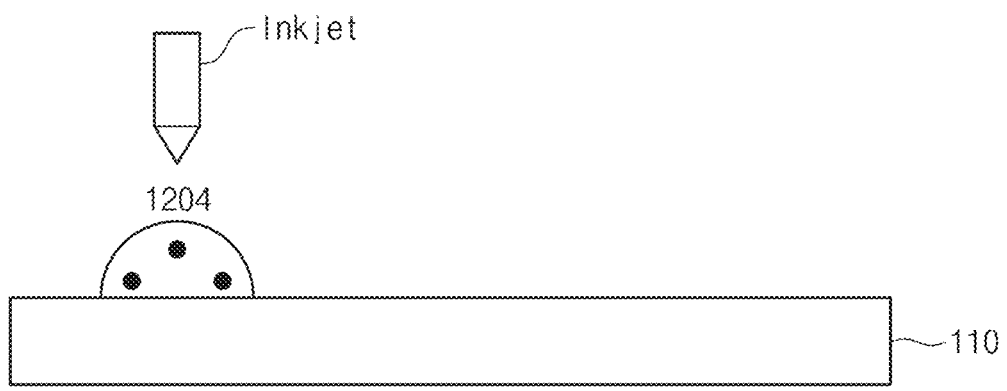
Figure 10:
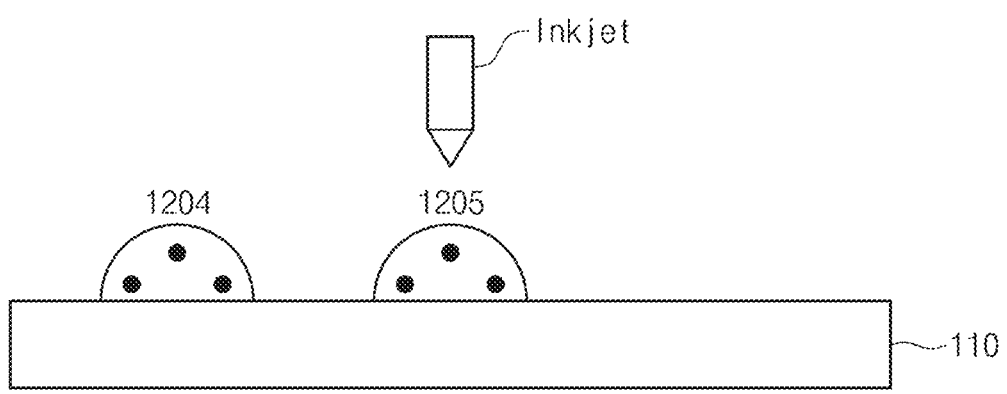
Figure 11:
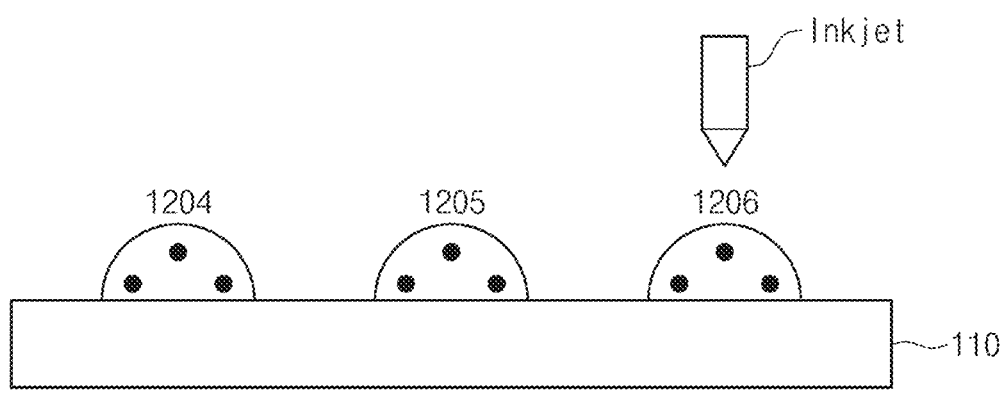
Figure 12:
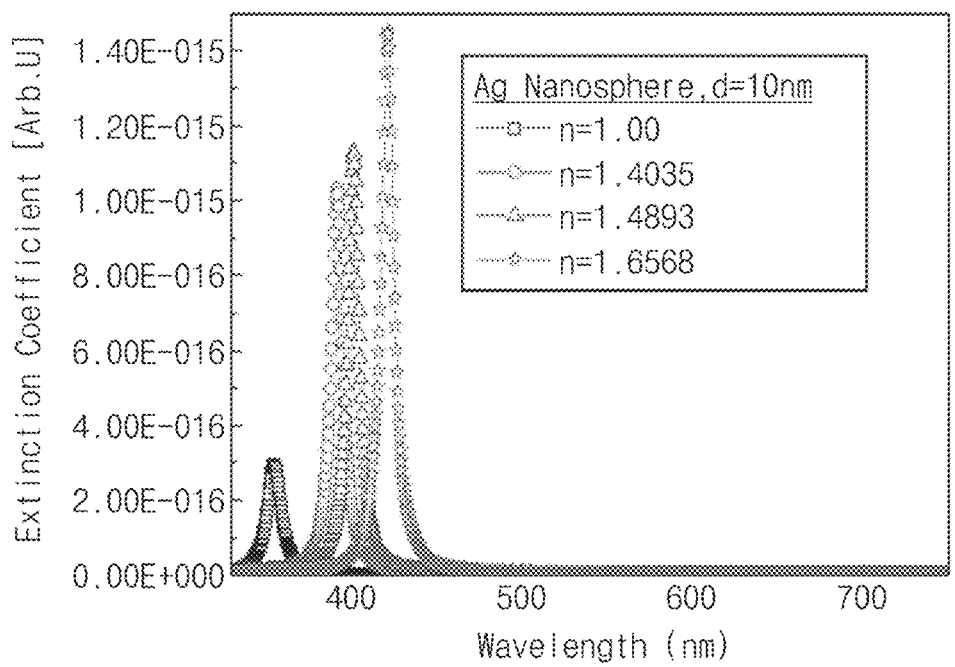
FIGS. 12 to 15 are graphs showing filter simulation results according to a size change and a medium refractive index change of a metal nanostructure manufactured according to an embodiment of the present invention.
Figure 13:
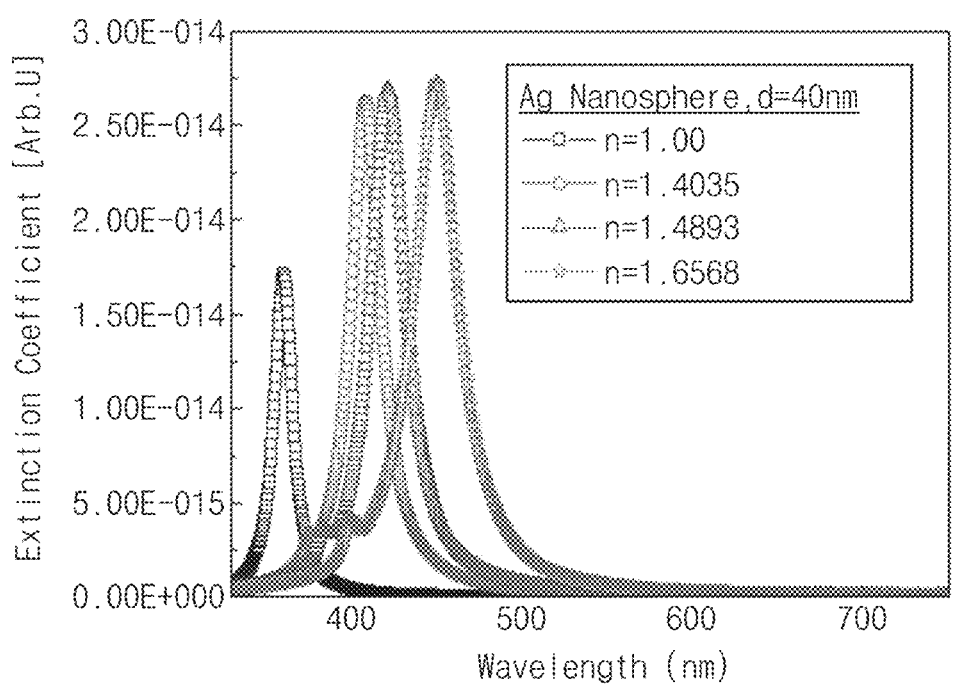
Figure 14:
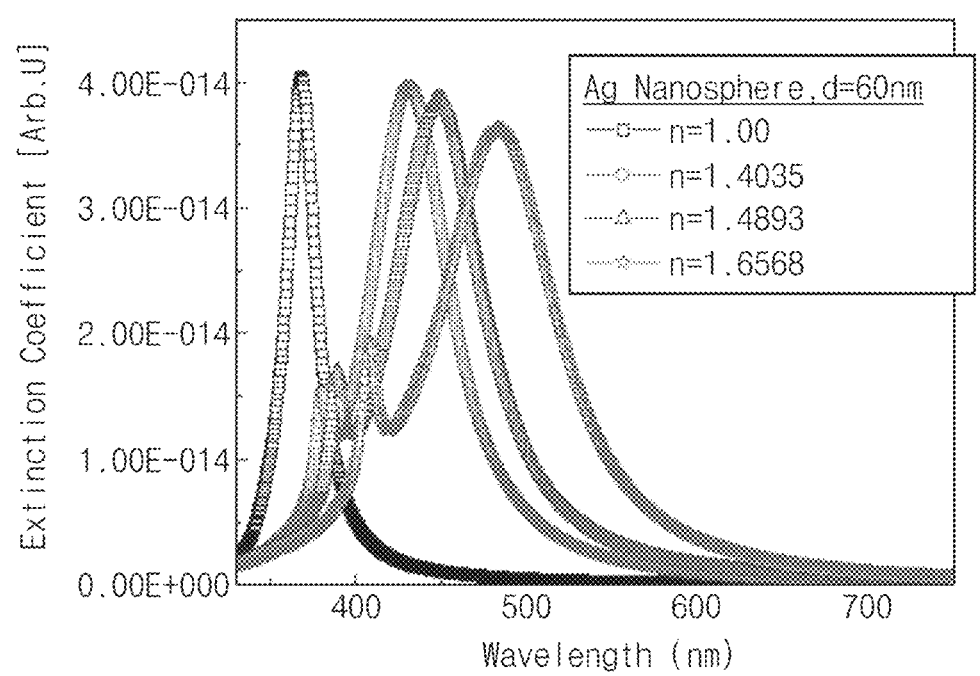
Figure 15:
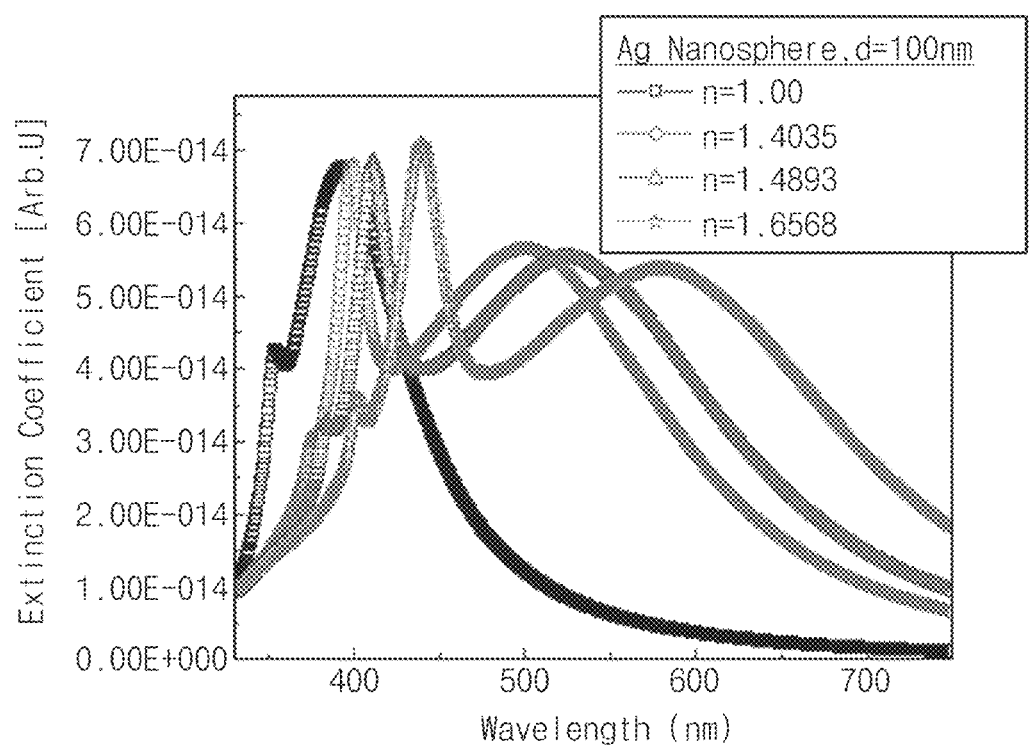

Referring to FIGS. 9 to 11, the mixture solution is injected to the upper surface of the structure in an inkjet scheme to form a filter region. When there are 9 filter regions, the above-described process may be repeated 9 times, and in this case, when wavelength bands of the filter regions are different from each other, polymer solutions having different refractive indexes are used. In this case, the kind of the nanostructures may be selectively differed.

The above-described scheme is shown as the inject scheme, but the present invention is not limited thereto and a process of printing the mixture solution, an automation system (e.g. automated pippeting system), or an array spotter may also be used. For the array spotter, a plurality of filter regions may be manufactured at once. Then, if necessary, a process of dehydrating the mixture solutions may also be adopted.

According to another scheme, instead of the polymer, an inorganic thin film including oxide may be adopted. According to this scheme, when the structure 100 such as the transmissive substrate is provided, a solution containing a necessary metal nanostructure is injected to the filter region at a determined position. The same metal nanostructure may be injected to the filter regions, or different metal nanostructures may also be injected thereto. After the hydrating process, if necessary, a desired inorganic thin film is deposited on a necessary position. At this point, the inorganic thin films deposited on respective filter regions may have different refractive indexes. The kind of the inorganic thin films is not specifically limited, but at least one or more of $HfO_2$, $ZrO_2$, ZnO, ZnSe, $TiO_2$, $Al_2O_3$, $SiO_x$, or SOG, etc., may be selected.

On the other hand, another optical filter of the present invention is formed by including two-dimensional filter regions on a plane in a checkerboard type such that when one direction is defined as X-axis, and a direction substantially vertical to X-axis is defined as Y-axis, different nanostructures are disposed in the X-axis, and media having different refractive indexes are spread in the Y-axis. The X- and Y-axes may be changed to each other. Such a configuration may be advantageous in process. For example, different metal nanostructures are disposed in each row in the X-axis direction and then media having different refractive indexes are spread in each row in the Y-axis direction. According to this scheme, the filter regions may have different transmissive wavelengths and the present optical filter may be manufactured in relatively less unit processes. Therefore there is an advantageous effect on process.

FIGS. 12 to 15 are graphs showing filter simulation results of a filter manufactured according to an embodiment of the present invention. FIGS. 12 to 15 show light extinction coefficients according to wavelengths of silver (Ag) nanospheres with the diameters of 10 nm, 40 nm, 60 nm, and 100 nm, as the refractive index n of a dielectric medium varies respectively n=1.00, 1.4035, 1.4893, and 1.6568. The present simulation results show that total 16 (i.e. 4×4) kinds of filters may be manufactured using 4 media.

Figure 16:
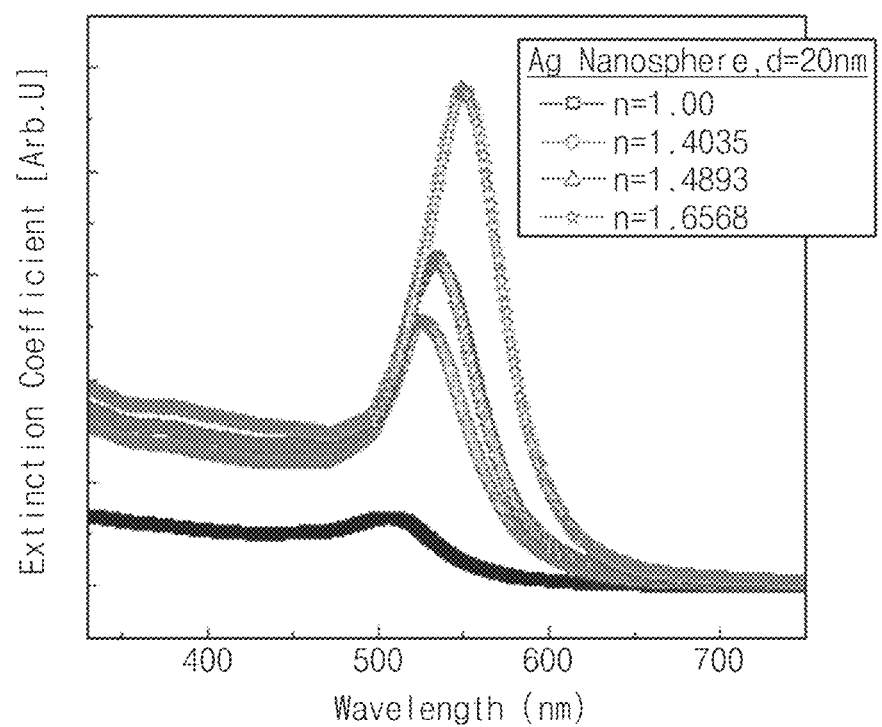
FIGS. 16 and 17 are graphs showing filter simulation results according to a material kind change of a metal nanostructure manufactured according to an embodiment of the present invention.
Figure 17:
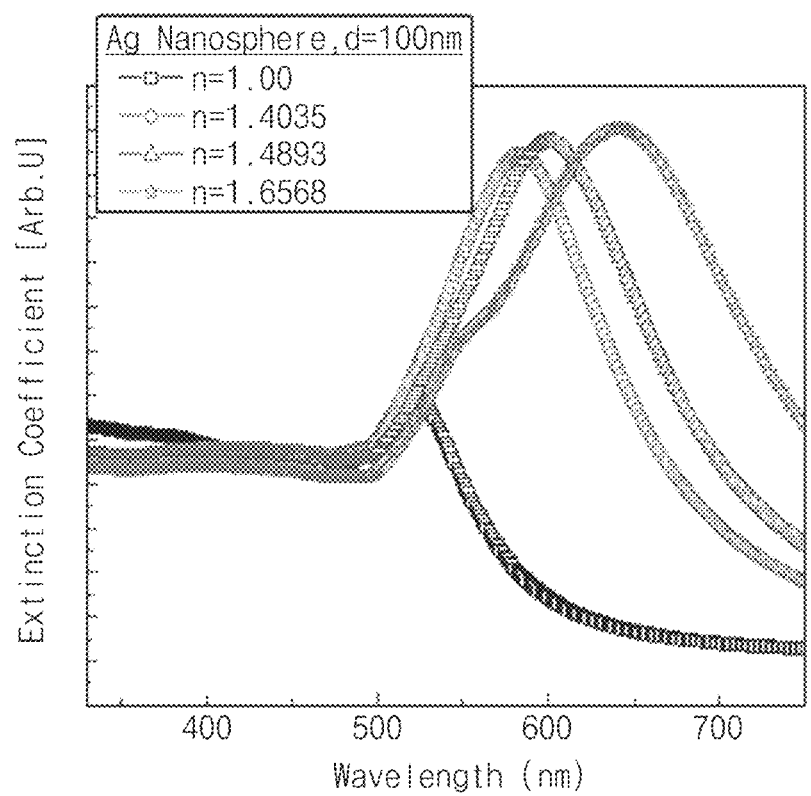

FIGS. 16 and 17 are graphs showing simulation results of a filter manufactured with another material according to an embodiment of the present invention. When mainly describing differences with FIGS. 12 to 15, the material is changed from silver (Ag) to gold (Au) and the light extinction coefficients are shown according to wavelengths of nanospheres having 20 and 100 nm size, as the refractive index n is changed.

Figure 18:
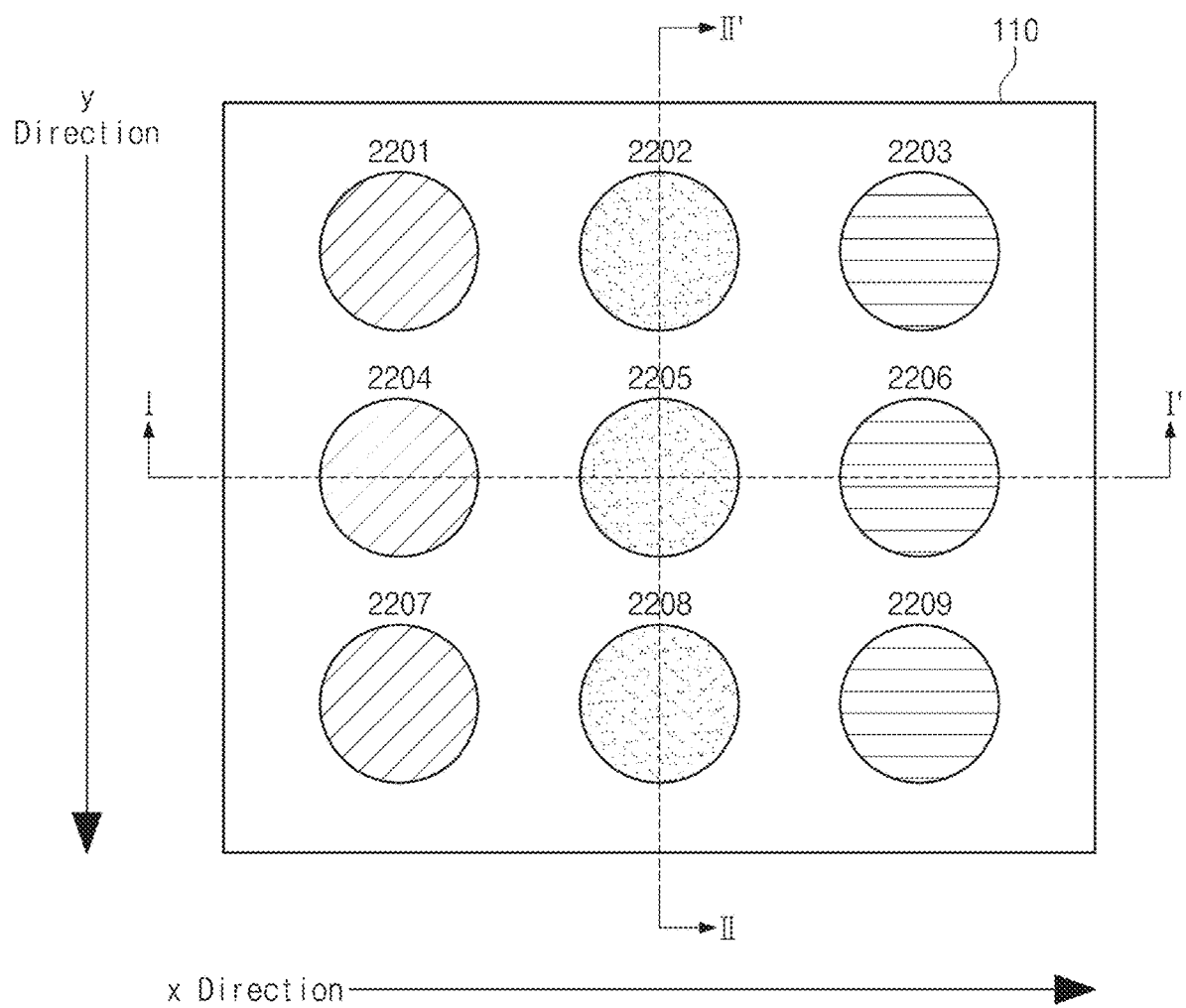
FIG. 18 is a plan view for explaining a method of manufacturing an optical filter according to another embodiment of the present invention.

Next, a description will be provided about a method of manufacturing an optical filter according to another embodiment of the present invention. FIG. 18 is a plan view for explaining a method of manufacturing an optical filter according to another embodiment of the present invention. The present manufacturing process uses a photolithography process. When the photolithography process is adopted, an existing semiconductor process may be applied. Therefore, a separate apparatus such as an inkjet apparatus is not required, and therefore a low cost and high reliability, etc., may be secured, which result mass production.

Referring to FIG. 18, two different schemes are used in order to differently configure 9 filter regions, but if necessary, only one scheme may be separately and individually used.

Figure 19:
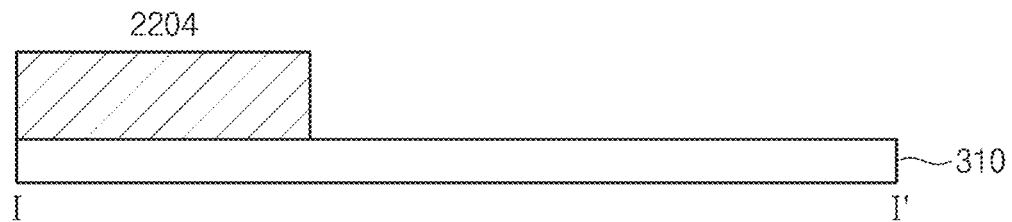
FIGS. 19 to 21 are process charts of an example of manufacturing an optical filter according to an embodiment of the present invention.
Figure 20:
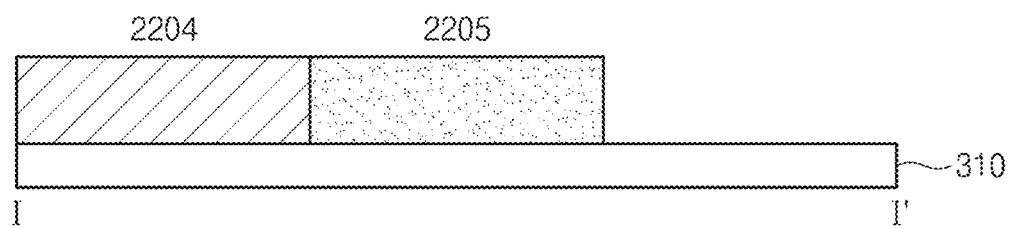
Figure 21:
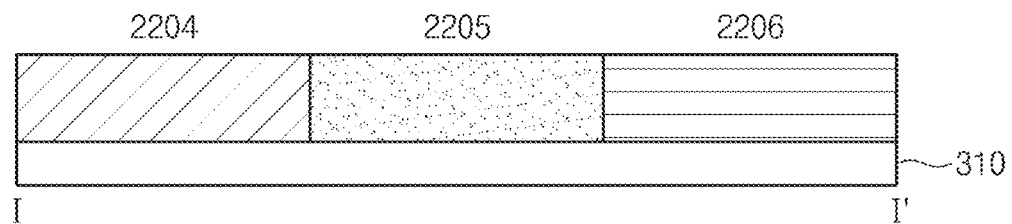

FIGS. 19 to 21 are process charts of an example of manufacturing the optical filter of FIG. 18 according to an embodiment of the present invention. First, first layers 2201, 2204, and 2207 are formed which are provided with a first material and a first metal nanostructure on an entire upper part of a structure 310. For example, the first layers 2201, 2204, and 2207 manufactured by injecting a nanostructure to a polymer material having a first refractive index are spread in a spin coating scheme, etc., on an entire surface of the upper part of the structure. Then, the first layers 2201, 2204, and 2207 are left on a part of the filter regions and are removed from the remaining filter regions by using a photolithography scheme (see FIG. 19).

Then, in the same scheme, second layers 2202, 2205, and 2208 are formed which are provided with a second material and a second metal nanostructure on the entire upper part of a structure 310. Then, the second layers 2202, 2205, and 2208 are left on a part of the filter regions and are removed from the remaining filter regions by using a photolithography scheme (see FIG. 20).

Then, in the same scheme, third layers 2203, 2206, and 2209 are formed which are provided with a third material and a third metal nanostructure on the entire upper part of the structure 310. Then, the third layers 2203, 2206, and 2209 are left on a part of the filter regions and are removed from the remaining filter regions by using a photolithography scheme (see FIG. 21).

Such a scheme may be more effectively used when only three optical filters of R, G, B are necessary in the visible region.

Figure 22:
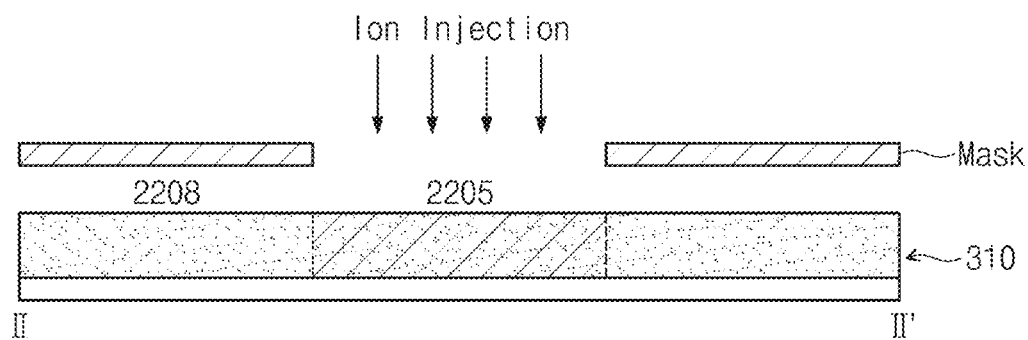
FIGS. 22 to 24 are process charts of an example of manufacturing the optical filter according to another embodiment of the present invention.
Figure 23:
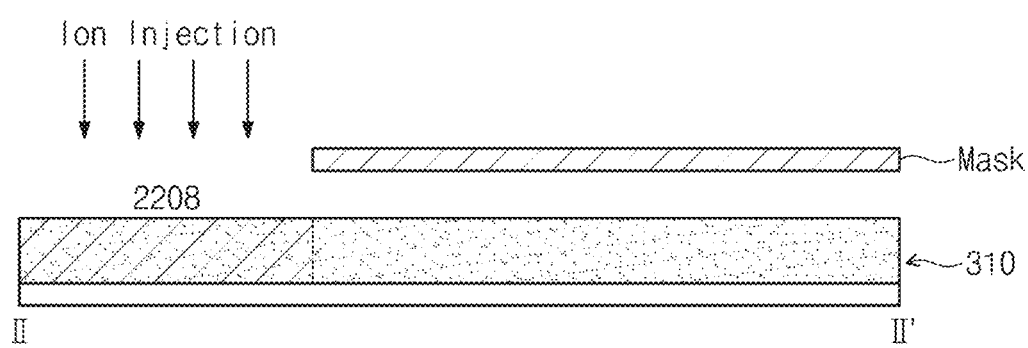
Figure 24:
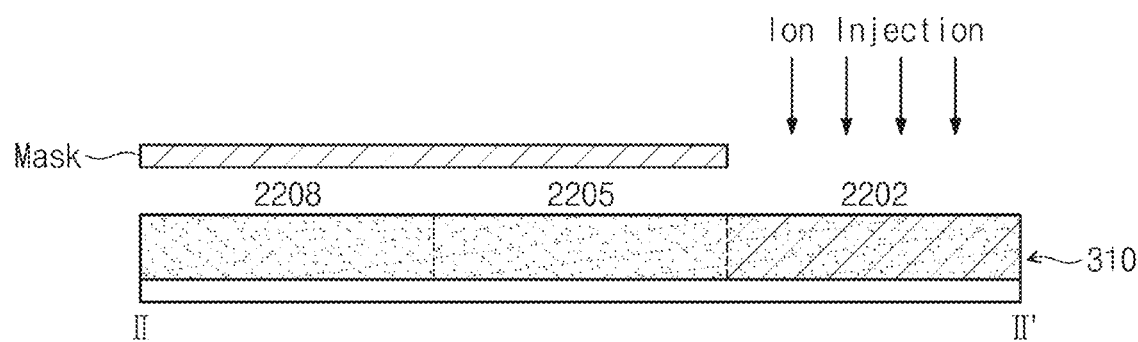

FIGS. 22 to 24 are process charts of manufacturing the optical filter according to another embodiment of the present invention. FIGS. 22 to 24 show cross sections cut along II-IF of FIG. 18.

The first layers 2201, 2204, and 2207, the second layers 2202, 2205, 2208, and the third layers 2203, 2206, and 2209 are respectively formed by the processes shown in FIGS. 19 to 21. In this situation, different amounts of materials are added in a y-direction of FIG. 18 to make y-axis refractive indexes of three filter region groups different. For example, when an arbitrary ion is injected to a medium, a refractive index is slightly changed. According to this principle, it is possible to adopt a scheme in which different amounts of ions are injected to three group filter regions in each direction.

First, the y-directional first group filter regions 2207, 2208, and 2209 are opened using an ion-injection mask. Then an arbitrary amount $m_1$ of ion is injected. Then, the y-directional second group filter regions 2204, 2205, and 2206 are opened using the ion-injection mask. Then an arbitrary amount $m_2$ of ion is injected. Then, the y-directional third group filter regions 2201, 2202, and 2203 are opened using the ion-injection mask. Then an arbitrary amount $m_3$ of ion is injected.

As described above, FIGS. 16 and 17 exemplarily show manufacturing of filter regions having 9 different wavelength bands using a process of two different schemes. In actual implementation, it is possible to implement to have 9 different filter regions by using processes of FIGS. 19 to 21, and it is also possible to implement 9 different filter regions by using processes of FIGS. 22 to 24.

Figure 25:
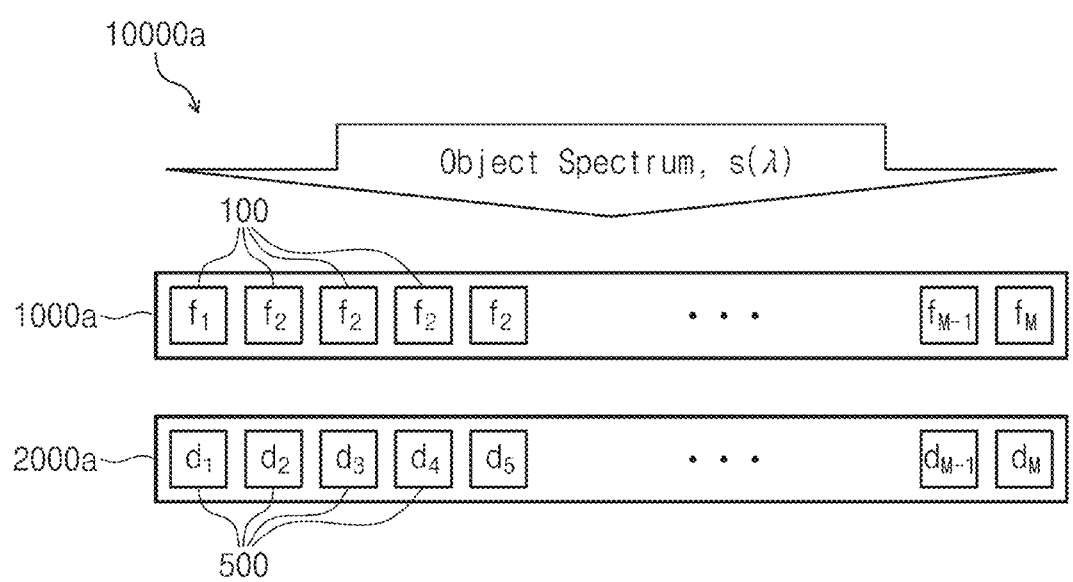
FIG. 25 is a conceptual diagram of a one-dimensional spectroscope according to an embodiment of the present invention.

FIG. 25 is a conceptual diagram of a one-dimensional spectroscope according to an embodiment of the present invention.

FIG. 25 shows an example in which a spectroscopic device 10000a is configured through one-dimensional linear array coupling between a filter array 1000a and a photodetector 2000a. In a schematic diagram, the spectroscopic device 10000a is illustrated which includes the filter array 1000a configured from M filter regions 100 and the photodetector 2000a configured from M photodetection units 500. A period of each optical filter is determined to be matched with a period of the photodetection unit 500 of the coupled one-dimensional linear array photodetector, or the size of a plurality of groups of the photodetection units 500. In other words, the coupling between the filter and a pixel of the photodetector may be 1-to-1 or 1-to-multiple.

Figure 26:
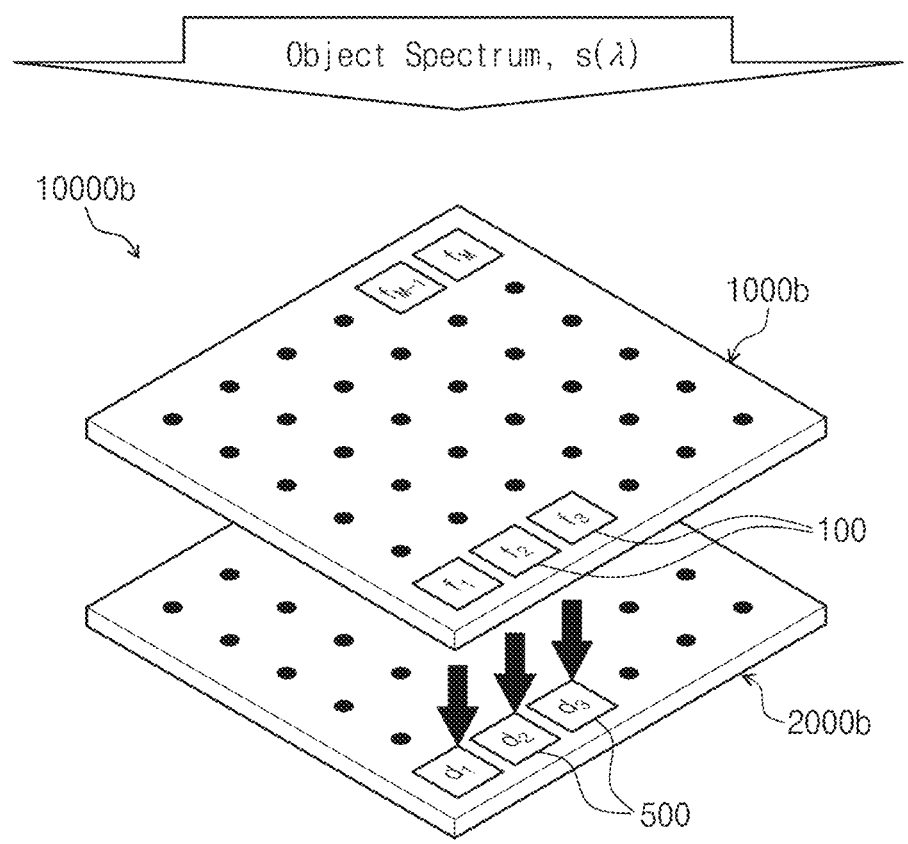
FIG. 26 is a conceptual diagram of a two-dimensional spectroscope according to an embodiment of the present invention.

FIG. 26 is a conceptual diagram of a two-dimensional spectroscope according to an embodiment of the present invention. An example is illustrated in which a spectroscope 10000b is configured through two-dimensional-array coupling between a filter array 1000b and a photodetector 2000h. It is advantageous in integration in comparison to the one-dimensionally-coupled spectroscope 10000a, and in coupling with an existing CMOS image sensor, etc. The spectroscopes 10000a and 10000b enable a filter to pass a light and intensity information is enabled to be output from a light of specific wavelength band of which a central wavelength is slightly moved for each position in one direction of the filter.

Accordingly, the spectroscopes operate as a spectrometer that enables conversion to a strength distribution according to a light wavelength, and a spectroscope based on a filter array may be realized.

Figure 27:
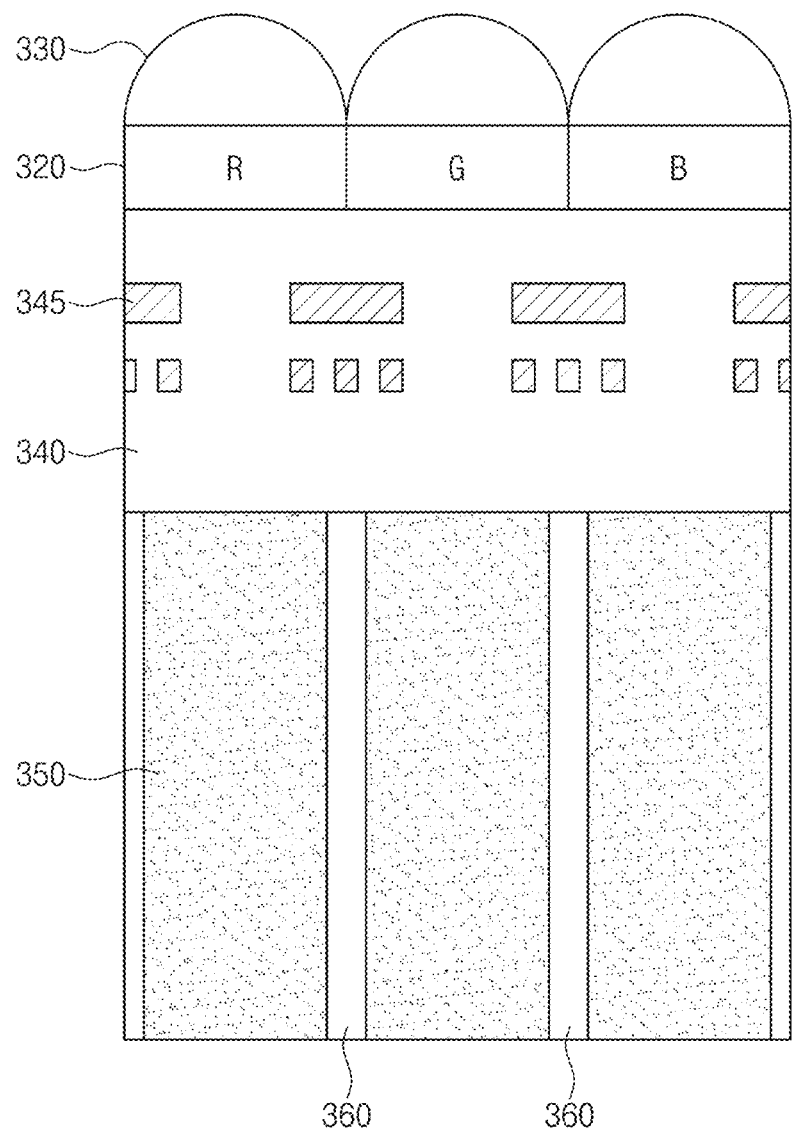
FIGS. 27 and 28 are conceptual diagrams of image sensors according to an embodiment of the present invention.
Figure 28:
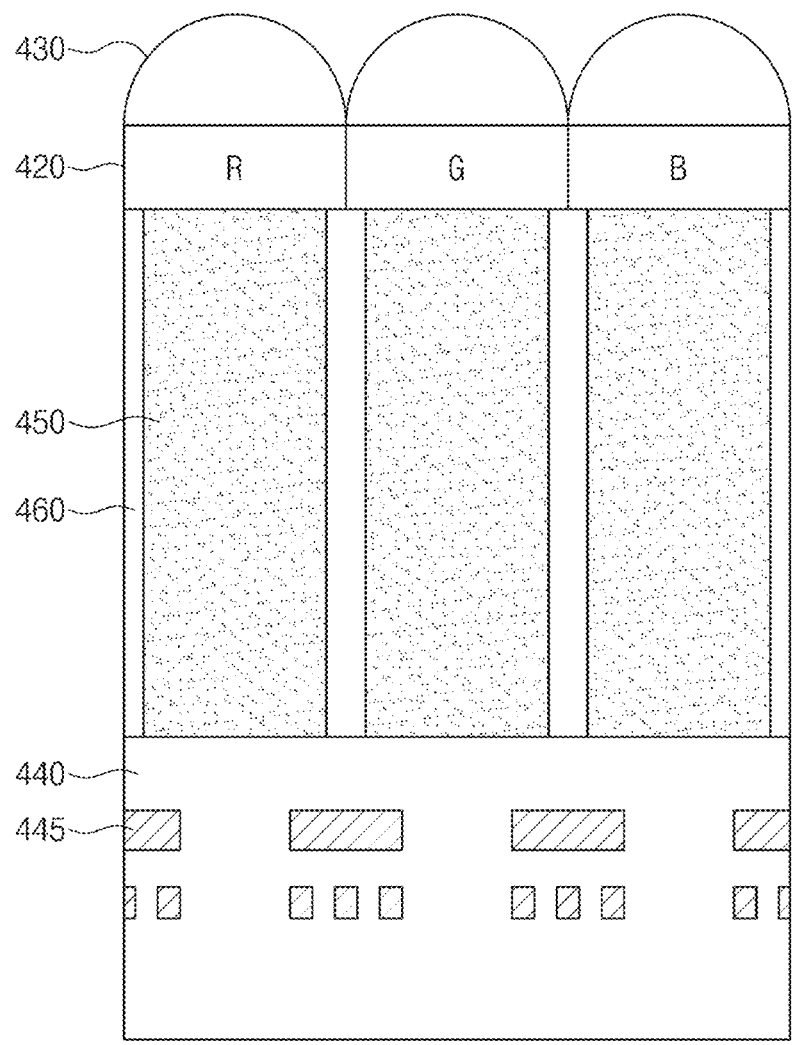

FIGS. 27 and 28 are conceptual diagrams of image sensors according to an embodiment of the present invention. FIGS. 27 and 28 respectively correspond to manufacturing structures of CMOS image sensors of FIS and BIS schemes. Such image sensor structures have color filters of R, G, B, etc., essentially added thereto. The optical filter of the present invention may be applied to R, G, B of such CMOS image sensors. For the CMOS image sensors, all the schemes of FIGS. 8 to 11, FIGS. 19 to 21, and FIGS. 22 to 24 may be possibly applied, but in order to easily apply to a semiconductor process, it may be effective to apply the schemes of FIGS. 19 to 21, and/or FIGS. 22 to 24.

Referring to FIG. 27, a separation region 360 is interposed between photo detection regions 350, and various kinds of electrode lines 345 are formed inside an intermediate dielectric region 340. In addition, on the upper part thereof, R, G, B filter regions 320 are formed, and thereon, micro-lenses 330 are formed in correspondence to the R, G, B filter regions 320.

Referring to FIG. 28, various kinds of electrode lines 345 are formed inside a dielectric region 340. On the upper part thereof, a separation region 460 is interposed between photo detection regions 450. In addition, R, G, B filter regions 420 are respectively formed on the photo detection regions 450, and thereon, micro-lenses 430 are respectively formed in correspondence to the R, G, B filter regions 420.

Figure 29:
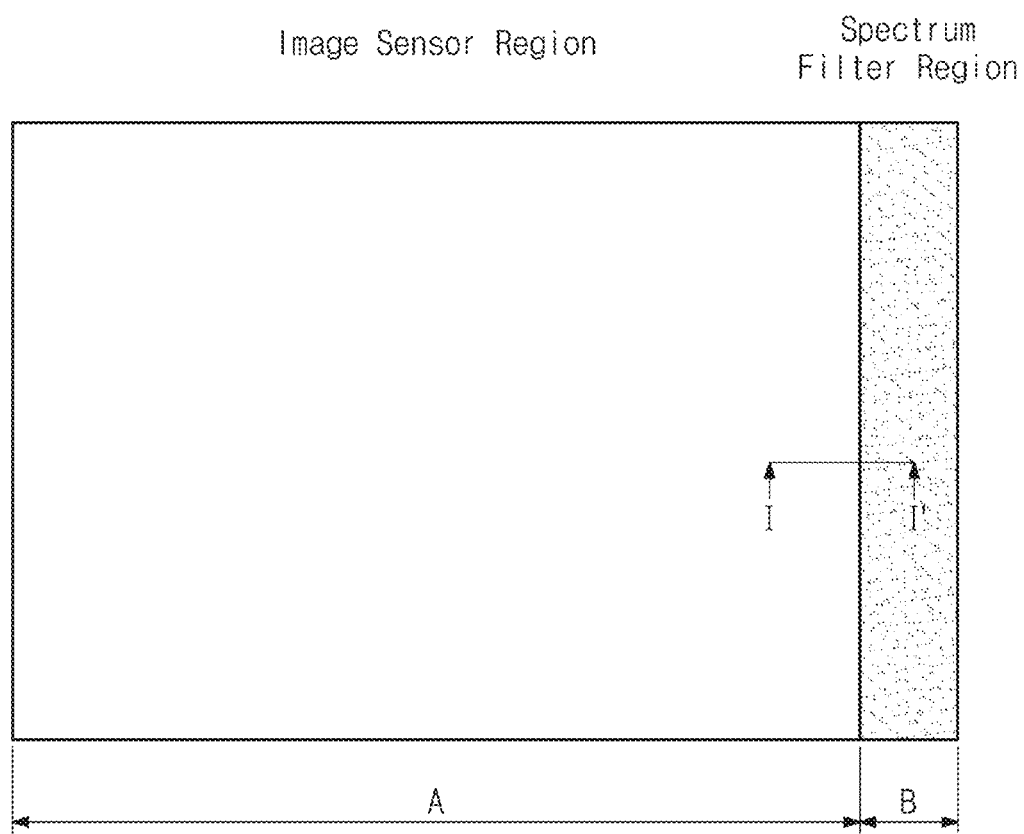
FIGS. 29 to 35 are drawings for explaining a situation in which an image sensor and a spectral sensor are integrated according to an embodiment of the present invention.

FIG. 29 is a conceptual diagram for explaining a situation in which a CMOS image sensor and a spectral sensor are integrated according to an embodiment of the present invention.

Figure 30:
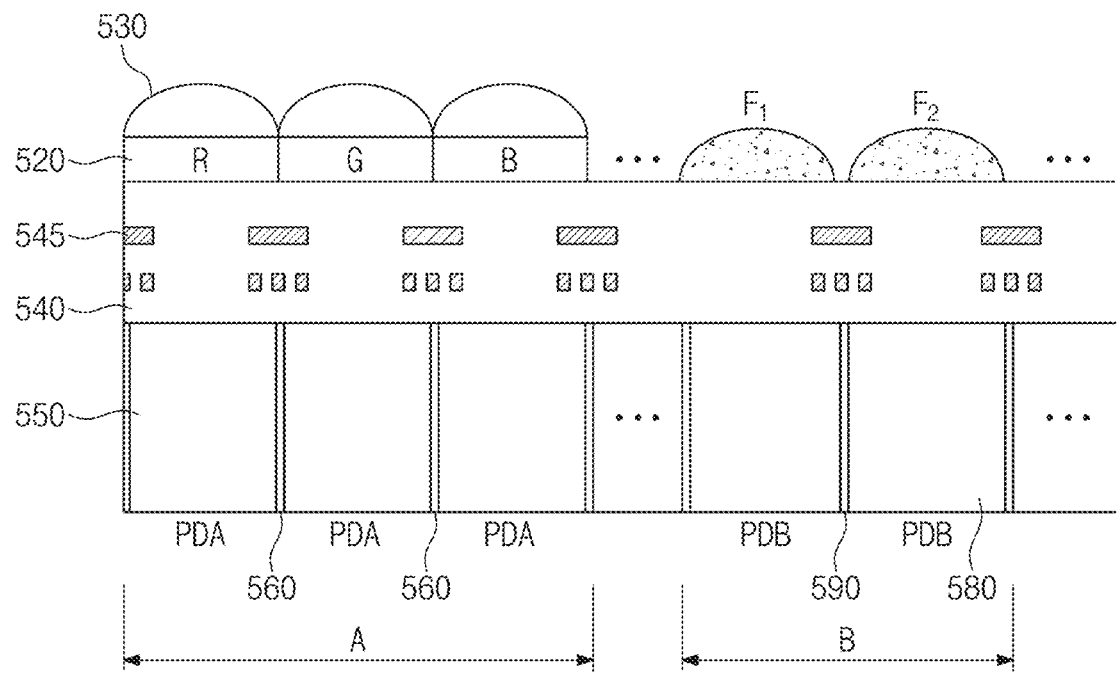

Referring to FIG. 29, an example is illustrated in which a CMOS image sensor region A and a spectrum sensor region B are integrated on the same substrate, but are spatially separated. FIG. 30 is a cross section cut along I-I' of FIG. 29.

The CMOS image sensor region A and the spectrum sensor region B will be separately described. For the CMOS image sensor region A, a separation region 560 is interposed between the photo detection regions 550, and various kinds of electrode lines 545 are formed inside the intermediate dielectric region 540. In addition, on the upper part thereof, R, G, B filter regions 520 are formed, and thereon, micro-lenses 530 are formed in correspondence to the R, G, B filter regions 520. For the spectrum sensor region B, the separation region 590 is interposed between the photo detection regions 580, and various kinds of electrode lines 545 are formed inside the intermediate dielectric region 540. And, in the spectrum sensor region B, spectrum sensor filters F1, F2, . . . are disposed on the upper part of the intermediate dielectric region 540. As the spectrum sensor filters F1, F2, . . . various filters are applicable which have different wavelengths or different structures from R, G, B color filters of the CMOS image sensor, but are specifically limited thereto. For example, the spectrum sensor filter of FIG. 1 is illustrated in FIG. 30, but is not limited thereto. As an example of another available filter, a diffraction grating scheme, a prism scheme, a Fabry-Perot resonance filter, a plasmonic filter including a metal nanostructure array or a metal nanohole array, a silicon nanowire-based filter, an absorptive filter, a resonant waveguide resonance mode filter, or an optical interference spectral filter using integrated-optics, etc., may be available. Any types of spectrum filters disclosed in Korean patent application publication nos. 2016-0106416, 2016-0106422, 2016-0110789, and 2016-0110799 applied by the same applicant of the present invention may be applied to filters of the spectrum image sensor region B. Each spectrum filter is devised for obtaining information of a corresponding wavelength band.

On the other hand, when defining differences between spectrum filters and R, G, B filters, the RGB filters are implemented to secure information of a wavelength region corresponding to each color. In comparison thereto, each spectrum filter may be configured to secure information of wavelength bands in the visible ray, or an infrared ray and ultraviolet ray, etc., outside the visible ray. For the visible ray, it is possible to variously realize wavelength bands in which information may be secured from each spectrum filter. For example, an R filter is for acquiring information of a red color wavelength region (about 625 nm to 750 nm), but each spectrum filter of the spectrum image sensor region B may divide a wavelength band by several nm to several tens of nm unit and secure corresponding information. In addition, it is also possible to perform a function of filtering wavelength information of an infrared ray or ultraviolet ray region outside the visible ray region covered by the RGB filters.

On the other hand, it is also possible or not possible to form separate micro-lenses 530 on the upper part of the spectrum sensor filters F1, F2, . . . formed in the spectrum sensor region B. However, FIG. 30 illustrates a case where the micro-lenses are not formed.

In addition, it is possible to form an additional layer between the spectrum sensor filters F1, F2, . . . and the intermediate dielectric region 540, or on the upper part of the spectral sensor filters F1, F2, . . . . For example, a separate layer such as a planarization layer, a protection layer, or a natural oxide layer, etc., may be added between the spectrum sensor filters F1, F2, . . . , and the intermediate region 540, and on the upper part of the spectrum sensor filters 1, F2, . . . a passivation layer such as a silicon oxide layer, a silicon nitride layer, or a dielectric layer, etc., may be possibly added.

Implementation examples will be described. According to one implementation example, wavelength regions that are photodetecting regions in the spectrum sensor region B and are detectable by photo-detecting diodes PDB have about 300 nm to 1000 nm, and spectral filters are configured such that an entire region may be filtered in a several nm or several tens of nm unit. When each spectral filter is configured in a 10 nm unit, 70 spectral filters may be configured for filtering different wavelengths with 300 nm to 310 nm, 310 nm to 320 nm, . . . , 990 nm to 1000 nm.

According to another implementation example, spectral filters of the spectrum sensor region B may be configured to filter infrared region wavelengths, and to filter 700 nm to 1000 nm in several nm unit. In this case, when each spectral filter is configured in 5 nm unit, 60 spectral filters may be configured for filtering different wavelengths with 700 nm to 705 nm, 705 nm to 710 nm, 995 nm to 1000 nm.

Figure 31:
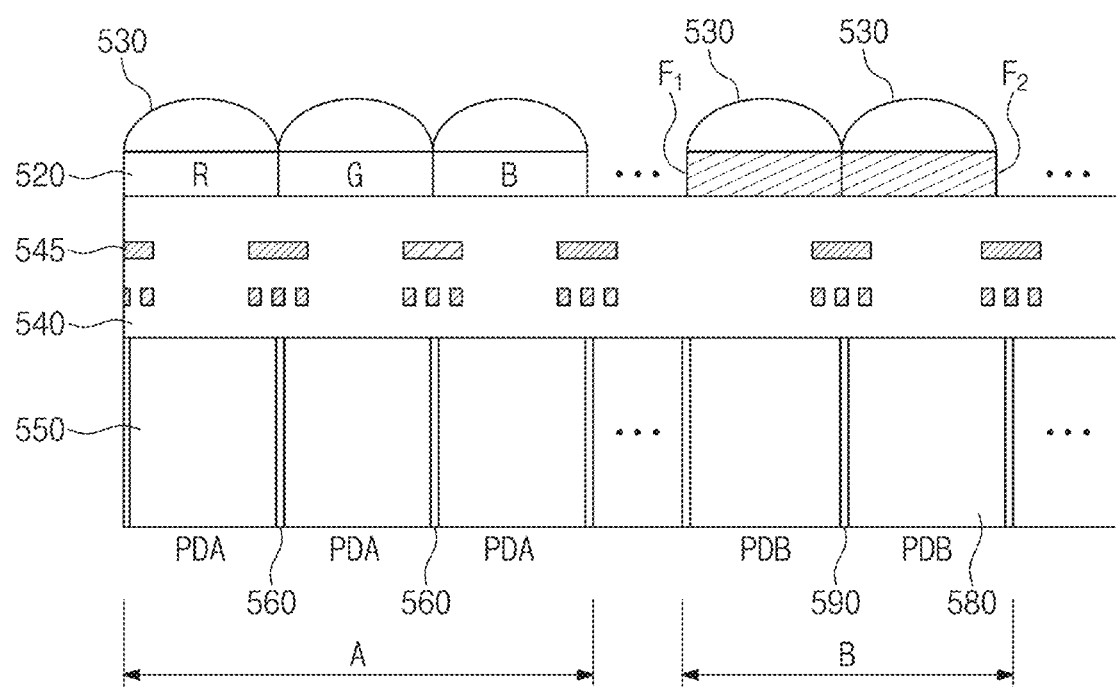

FIG. 31 is a cross-section view illustrating another modified example of FIG. 30.

When mainly describing a difference with FIG. 30, FIG. 31 illustrates a situation in which separate micro-lenses 530 are formed on the upper part of the spectrum sensor filters F1, F2, . . . , formed in the spectrum sensor region B. In this case, the spectrum sensor filters F1, F2, . . . , and the micro-lenses 530 are illustrated to directly contact each other, but in actual implementation, an insulation layer, a planarization layer, a passivation layer, or a protection layer, etc., may be possibly added thereto.

Figure 32:
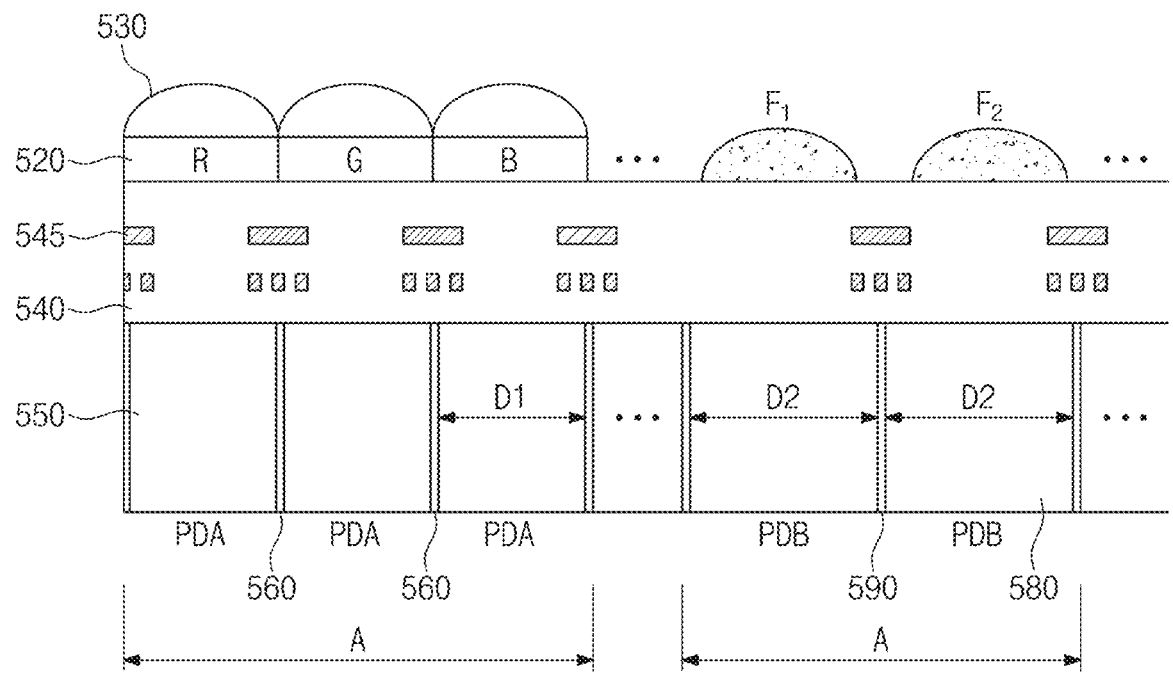

FIG. 32 is a cross-sectional view illustrating another modified example of FIG. 29. When mainly describing a difference with FIG. 30, FIG. 32 illustrates a situation in which a pixel size of the spectrum sensor filters F1, F2, . . . , formed on the spectrum sensor region B is different from that of the R, G, B filter regions 520. This means that each photo-detecting region PDB of the spectrum sensor filters F1, F2, . . . may be manufactured with a different size from a photo-detecting region PDAA of the R, G, B filter region 520. The different size means that the size of a light incidence area is differently formed.

In FIG. 32, the width D2 of each photo detection region PDB of the spectrum sensor filters F1, F2, . . . , is illustrated to be wider than the width D1 of each photo detecting region of the image sensor region A. This may be understood that the area to which a light is incident in the photo detection region PDB is designed to be wider than that in the photo detection region PDA. Since the spectrum sensor filters F1, F2, . . . filter further subdivided wavelength regions than the R, G, B filters do, a light amount may be relatively small. However, the configuration of FIG. 32 may considerably compensate for such a small light amount.

On the other hand, FIG. 32 exemplarily illustrates that the size of the light incident area of each photo detection area PDB of the spectrum sensor filters F1, F2, . . . is larger than that of the photo detection area A of the R, G, B filter area 520, but if necessary, it is possible to configure the size of each photo detection area PDB of the spectrum sensor filters F1, F2, . . . to be smaller than that of the photo detection area A of the R, G, B filter area 520.

Figure 33:
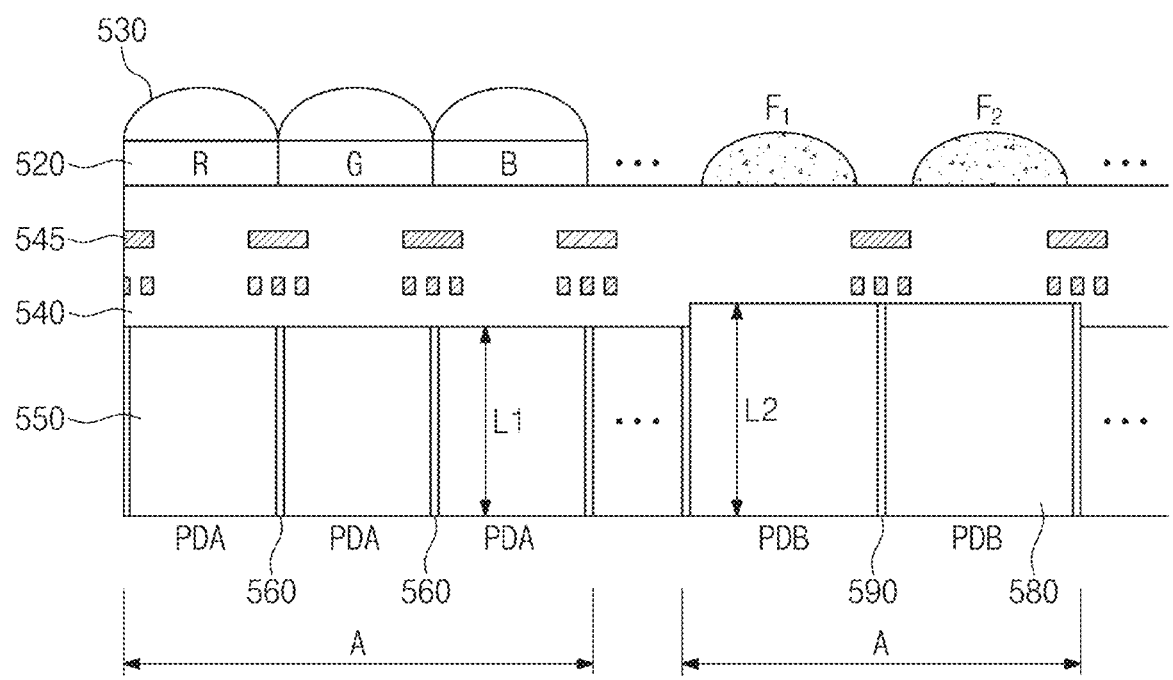

FIG. 33 is a cross-sectional view illustrating another modified example of FIG. 29. When mainly describing a difference with FIG. 30, FIG. 33 corresponds to another example that each photo detection region PDB of the spectrum sensor filters F1, F2, . . . is manufactured with a different size from the photo detection area A of the R, G, B filter region 520. FIG. 33 illustrates a case where the cross-sectional thickness L2 of each photo detection region PDB of the spectrum sensor filters F1, F2, . . . is larger than the cross-sectional thickness L1 of the photo detection region PDA of the R, G, B filter region 520. Since the spectrum sensor filters F1, F2, . . . filter further subdivided wavelength regions than the R, G, B filters, a light amount may be relatively small. Accordingly, such a small light amount may be considerably compensated with the configuration of FIG. 32.

On the other hand, FIG. 33 exemplarily illustrates the cross-sectional thickness L2 of each photo detection area PDB of the spectrum sensor filters F1, F2, . . . is larger than the cross-sectional thickness L1 of the photo detection area PDA of the R, G, B filter area 520, but if necessary, it is possible to configure the cross-sectional thickness D2 of the photo detection area PDB to be smaller than the cross-sectional thickness D1 of the photo detection region PDA of the R, G, B filter area 520.

Figure 34:
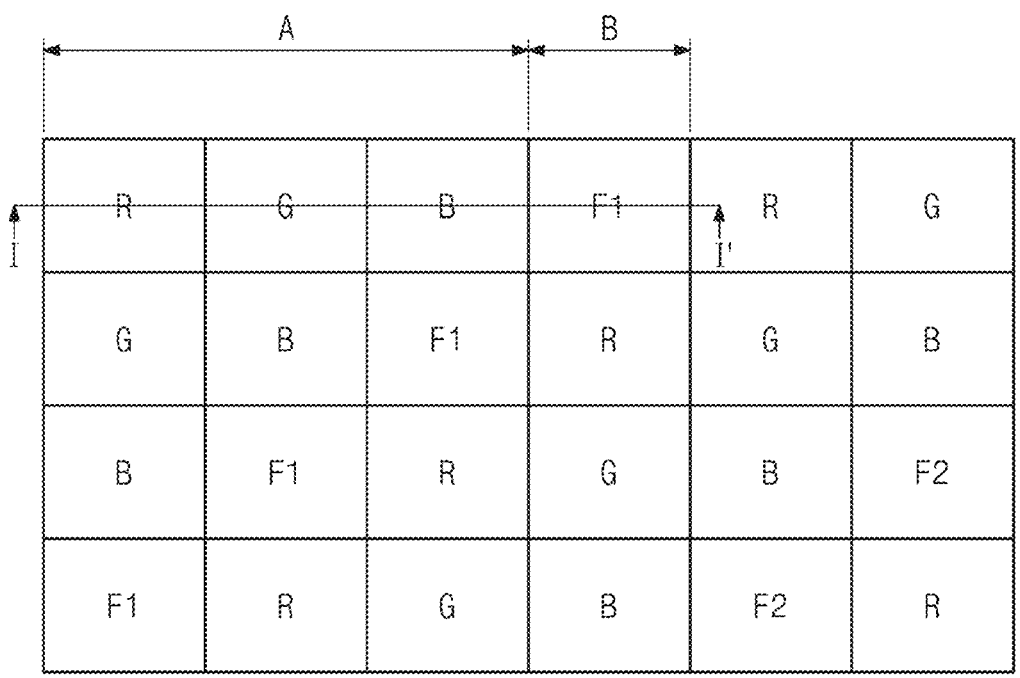
Figure 35:
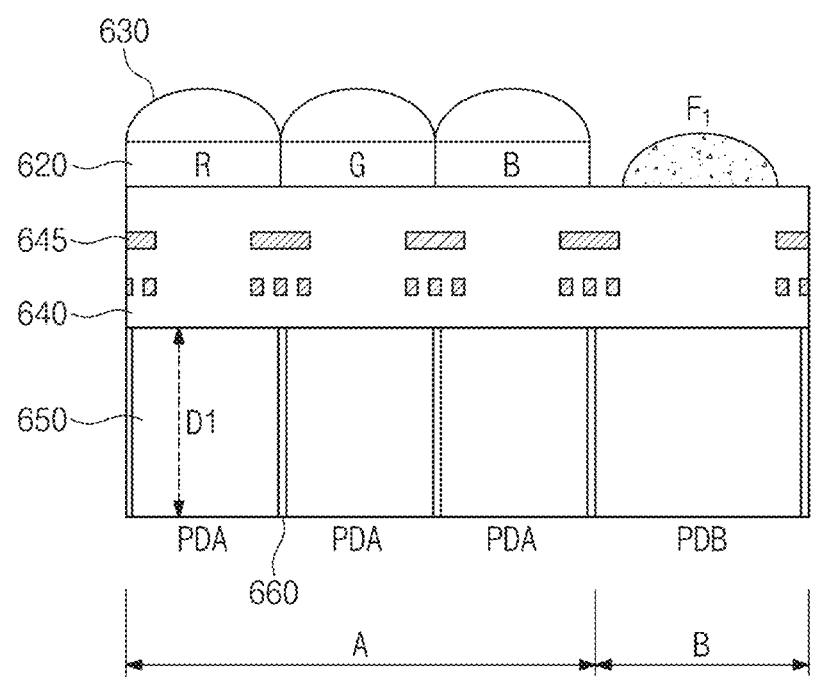

FIG. 34 is a conceptual diagram for explaining a situation in which a CMOS image sensor and a spectral sensor are integrated according to an embodiment of the present invention, and FIG. 35 is a cross-sectional view cut along I-I' of FIG. 34.

When mainly describing a difference with FIG. 29, FIG. 34 illustrates that unit pixels of a spectrum sensor are disposed together with the corresponding pixels of the CMOS image sensor. FIG. 34 illustrates RGB pixels, F1 unit spectrum filter, next RGB pixels, and F2 unit spectrum filter are disposed in that order.

The CMOS image sensor region A and the spectrum sensor region B will be separately described. For the CMOS image sensor region A, a separation region 660 is interposed between photo detection areas 6550 and various kinds of electrode lines 645 are formed inside an intermediate dielectric region 640. In addition, on the upper part thereof, R, G, B filter regions 620 are formed, and thereon, micro-lenses 630 are formed in correspondence to the R, G, B filter regions 620. For the spectrum sensor region B, a separation region 690 is interposed between photo detection regions 680, and various kinds of electrode lines 645 are formed inside an intermediate dielectric region 640.

Figure 36:
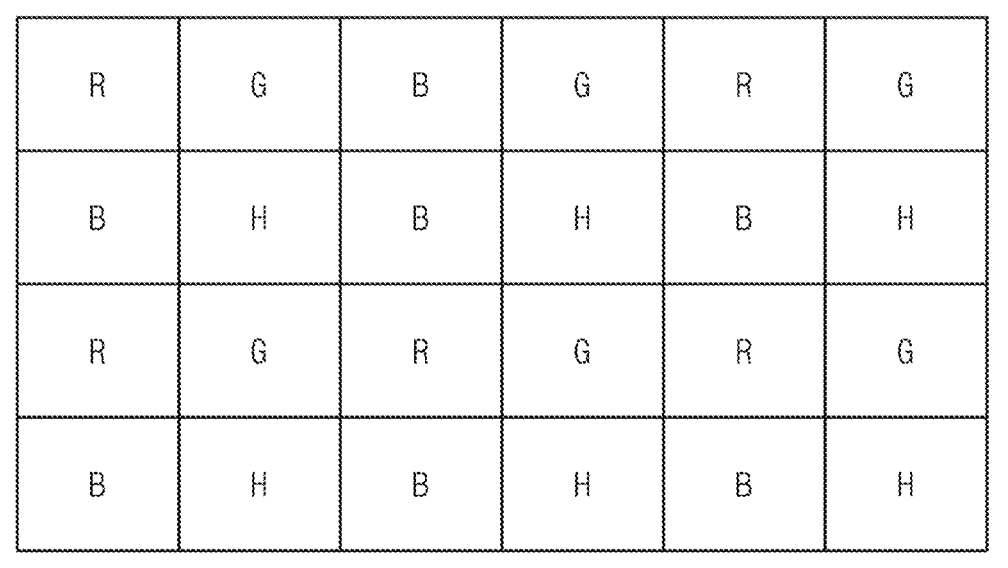

FIG. 36 illustrates a part of a unit pixel of a CMOS image sensor and a unit pixel of a hyper spectral image sensor.

The hyper spectral image sensor is an element configured to sense several (relatively narrow) wavelength parts or a wavelength band of an entire hyper spectrum emitted from or absorbed by a subject. The hyper spectral image sensor uses a principle of a typical spectroscope, and a wavelength band to be measured or observed thereby is typically known to be narrow.

As illustrated in FIG. 36, according to one embodiment of the present invention, the hyper spectral image sensor may be used in a type of being coupled to the CMOS sensor. In detail, a region referred to R, G and B denotes that of color filters configured to filter R, G, B of the CMOS image sensor, and a region referred to H denotes a filter region configured to sense a hyper spectral image. In filter region H, a partially narrow region in the infrared ray region is designated, and in this region, it is possible to secure hyper spectral data different from R, G, B.

While this invention has been described in connection with what is presently considered to be practical exemplary embodiments of an optical filter, it is to be understood that the invention is not limited to the disclosed embodiments, but, on the contrary, is intended to cover various modifications and equivalent arrangements included within the spirit and scope of the appended claims.

The invention claimed is:

1. An optical filter comprising:
   a first filter region comprising a first layer of a first refractive index and a plurality of first metal nanostructures in the first layer;
   a second filter region comprising a second layer of a second refractive index and a plurality of second metal nanostructures in the second layer; and
   a protection film covering the first filter region and the second filter region,
   wherein the first refractive index is different from the second refractive index,
   wherein the first layer and the second layer include a same material, and
   wherein the first metal nanostructures and the second metal nanostructures have substantially a same shape as a nanosphere, and the first metal nanostructures and the second metal nanostructures are different materials.

2. The optical filter of claim 1, wherein configuration materials added to the same material of the first layer and the second layer are different or a concentration of a configuration material added to the same material of the first layer and the second layer is changed so as to make the first and second refractive indexes different.

3. The optical filter of claim 1, wherein the first filter region and/or the second filter region have/has a plurality of metal nanostructures embedded in a dielectric material.

4. An optical device comprising:
   a planar optical filter of claim 1; and
   photodetection areas respectively corresponding to the first filter region and the second filter region.

5. The optical filter of claim 4, wherein the optical device is any one of a spectroscope, a CMOS image sensor, and a hyper spectral image sensor.

6. An optical device comprising:
a transmissive substrate; and
an optical filter of claim 1 disposed on an upper part of the transmissive substrate, wherein the transmissive substrate and the optical filter are separately assembled.

7. An optical device, comprising:
a color filter layer configured to filter an incident light to at least R, G, B;
a spectrum filter array configured to measure a spectrum of an object, the spectrum filter array including a first filter region and a second filter region, the first filter region includes: a first layer of a first refractive index; and a plurality of first metal nanostructures in the first layer, the second filter region includes: a second layer of a second refractive index which is different with the first refractive index; and a plurality of second metal nanostructures in the second layer; and
a plurality of photo detection regions configured to detect optical signals transmitted the color filter layer and the spectrum filter array,
wherein the color filter layer is disposed on an upper part in a first region of the plurality of photo detection regions, and the spectrum filter array is disposed on an upper part in a second region of the plurality of photo detection regions,
wherein the first layer and the second layer include a same material, and
wherein the first metal nanostructures and the second metal nanostructures have substantially same shape as a nanosphere.

8. The optical device of claim 7, wherein the spectrum filter array is an optical filter.

9. The optical device of claim 7, wherein each of photo detection pixels of the photo detection regions has an identical area to which an optical signal is incident.

10. The optical device of claim 7, further comprising:
a micro-lens on an upper part of the color filter and the spectrum filter array.

11. The optical device of claim 7, wherein unit spectrum filters of the spectrum filter array are disposed in a constant period between a grouping of filter regions of the color filter layer.

12. The optical device according to claim 7, wherein the photo detection regions are configured from photo detection pixels of a CMOS image sensor.

13. The optical device according to claim 7, wherein a size of a photo detection pixel of the photo detection regions corresponding to the color filter is different from that corresponding to the spectrum filter.

* * * * *